US011477670B2

(12) United States Patent
Mendoza et al.

(10) Patent No.: US 11,477,670 B2
(45) Date of Patent: *Oct. 18, 2022

(54) NETWORK RESOURCE FUNCTION SUPPORTING MULTI-REGION QUERYING

(71) Applicant: T-Mobile USA, Inc., Bellevue, WA (US)

(72) Inventors: Salvador Mendoza, Issaquah, WA (US); Rahul Pal, Bellevue, WA (US); Muhammad Waqar Afzal, Bellevue, WA (US); Muhammad Adnan Farooq, Bothell, WA (US); Suresh Thanneeru, Redmond, WA (US); Suliman Albasheir, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 25 days.

This patent is subject to a terminal disclaimer.

(21) Appl. No.: 17/103,915

(22) Filed: Nov. 24, 2020

(65) Prior Publication Data
US 2021/0084508 A1 Mar. 18, 2021

Related U.S. Application Data

(63) Continuation of application No. 16/453,383, filed on Jun. 26, 2019, now Pat. No. 10,856,158.

(Continued)

(51) Int. Cl.
*H04W 4/00* (2018.01)
*H04W 24/04* (2009.01)
(Continued)

(52) U.S. Cl.
CPC ......... *H04W 24/04* (2013.01); *H04L 67/1095* (2013.01); *H04W 88/18* (2013.01)

(58) Field of Classification Search
CPC ....... H04W 60/00; H04W 8/005; H04W 8/04; H04W 8/06
See application file for complete search history.

(56) References Cited

U.S. PATENT DOCUMENTS

2006/0245426 A1 11/2006 Rasanen
2019/0159015 A1* 5/2019 Qiao ..................... H04W 8/065
(Continued)

FOREIGN PATENT DOCUMENTS

| KR | 20180080791 A | 7/2018 |
|---|---|---|
| WO | WO2018004175 A1 | 1/2018 |
| WO | WO2018138381 A1 | 8/2018 |

OTHER PUBLICATIONS

3GPP TS 23.502 v15.4.0, Dec. 2018, 3rd Generation Partnership Project; Technical Specification Group Services and System Aspects: Procedures for the 5G System; Stage 2, pp. 1, 250-256 and 303-307.

(Continued)

*Primary Examiner* — Omoniyi Obayanju
(74) *Attorney, Agent, or Firm* — Lee & Hayes, P.C.

(57) ABSTRACT

A system, e.g., associated with a telecommunications network, includes first and second registry devices. In some examples, the first registry device receives a registration message. The second registry device receives a query specifying a type (NFType) of a network function and forwards the query to the first registry device based at least in part on the NFType. The first registry device responds, and the second registry device forwards the response. In some examples, the query specifies a service class and the second registry device forwards the query based at least in part on the service class. In some examples, the first registry device sends an indication of the registration to the second registry device, and the second registry device responds to the query (Continued)

based at least in part on the received indication and on at least one of an NFType or a service class of the query.

13 Claims, 10 Drawing Sheets

Related U.S. Application Data

(60) Provisional application No. 62/817,176, filed on Mar. 12, 2019.

(51) Int. Cl.
    *H04L 67/1095* (2022.01)
    *H04W 88/18* (2009.01)

(56) References Cited

U.S. PATENT DOCUMENTS

2019/0215724 A1* 7/2019 Talebi Fard .......... H04W 40/02
2020/0296606 A1   9/2020 Mendoza et al.

OTHER PUBLICATIONS

"3GPP; TSG SA; System Architecture for the 5G System; Stage 2 (Release 15)", 3GPP TS 23.501 V15.4.0, Dec. 2018, Section 7, 237 pages.
"Content Synchronization" Nov. 21, 2006, retrieved Mar. 26, 2019 from <<http://www.cse.tkk.fi/fi/opinnot/T-110.5120/2006/slides/contentSync_final.pdf>>, 33 p.
ETSI TS 123 501 v15.3.0, Sep. 2018, 5G; System Architecture for the 5G System, pp. 19-45, 184-185, and 188-203.
ETSI TS 129 510 v15.1.0, Oct. 2018, 5G; 5G System; Network Function Repository Services; Stage3, pp. 10-25, 34-37, and 46-58.
Office Action for U.S. Appl. No. 16/453,383, dated Mar. 18, 2020, Mendoza, "Network Resource Function Supporting Multi-Region Querying", 14 Pages.
The PCT Search Report and Written Opinion dated Jul. 2, 2020 for PCT Application No. PCT/US2020/021735, 10 pages.
"rSync-Network Protocol", May 23, 2014, retrieved Mar. 26, 2019 from <http://tutorials.jenkov.com/rsync/network-protocol.html>>. 4 pages.
The International Report on Preliminary Patentability for PCT App. No. PCT/US20/21735, dated Sep. 23, 2021.

* cited by examiner

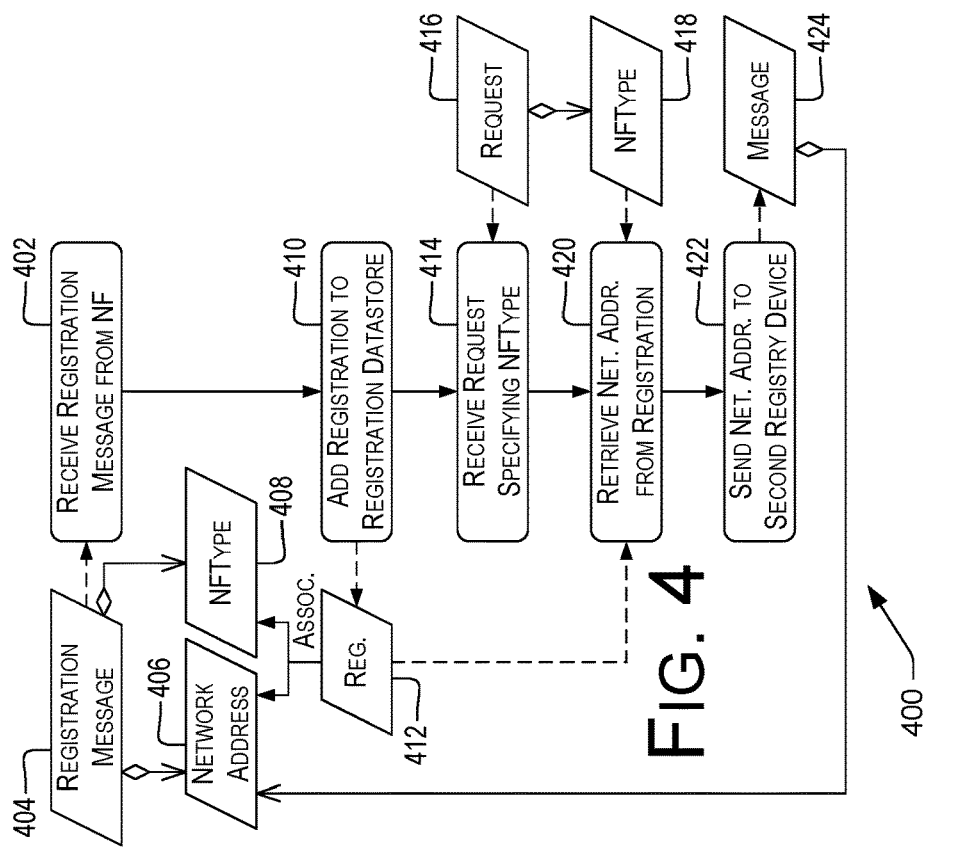

NETWORK RESOURCE FUNCTION SUPPORTING MULTI-REGION QUERYING

CROSS-REFERENCE TO RELATED APPLICATION

This application is a continuation of and claims priory to U.S. patent application Ser. No. 16/453,383, filed on Jun. 26, 2019, titled "NETWORK RESOURCE FUNCTION SUPPORTING MULTI-REGION QUERYING," which is a non-provisional application of, and claims priority to and the benefit of, U.S. patent application Ser. No. 62/817,176, filed Mar. 12, 2019, titled "NETWORK RESOURCE FUNCTION SUPPORTING MULTI-REGION QUERYING," the entirety of both which are incorporated herein by reference.

BACKGROUND

In 5G and other cellular systems, core-network services are provided by network functions (NFs). In some systems, NFs are configured with network hostnames or addresses of NFs with which they may need to communicate. In other systems, provider NFs register with a registry device, such as a 5G Network Resource Function (NRF). A consumer network function (NF) that wishes to use the services of a provider NF requests network information of that provider NF from the registry device. In some networks that use a single registry device for the entire network, that registry device can be a single point of failure and can reduce uptime of the network as a whole.

BRIEF DESCRIPTION OF THE DRAWINGS

Objects, features, and advantages of various examples will become more apparent when taken in conjunction with the following description and drawings wherein identical reference numerals have been used, where possible, to designate identical features that are common to the figures. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

FIG. 4 is a dataflow diagram illustrating an example process (e.g., at a global registry device) for providing a network address of an NF, and related data items, according to various examples.

FIG. 5 is a dataflow diagram illustrating an example process (e.g., at a regional registry device and based on an NF type) for providing a network address of an NF, and related data items, according to various examples.

DETAILED DESCRIPTION

Overview

Figure 1:
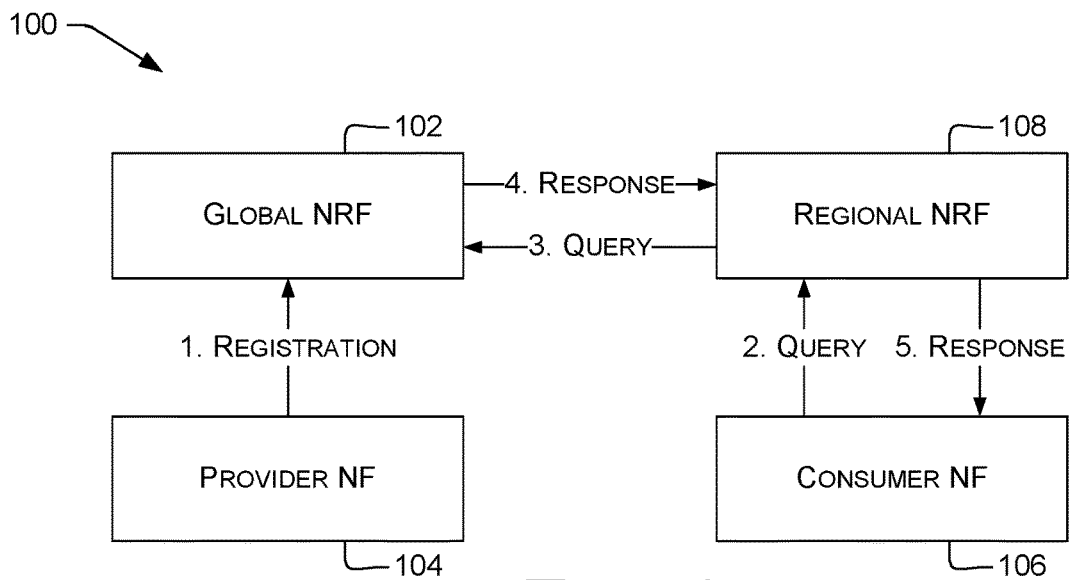
FIG. 1 shows an example network system and messages according to various examples.

Some (e.g., nationwide) cellular networks are divided into regions to contain failures and ease maintenance. However, some NFs, such as subscriber-profile querying, are more effectively performed by centralized ("global") servers than by per-region servers. In some examples, the NRF for a region forwards queries related to such centralized services to an NRF dedicated to those services. In some examples, the centralized services register with a dedicated NRF, which reports the registration to a centralized master NRF. The NRF for a region forwards such queries to a regional master NRF that synchronizes with the centralized master NRF. In some examples, roaming is treated as an additional region for purposes of NRFs. Throughout this document, terms such as "global" and "network-wide" do not require any particular geographical scope. For example, a "global" NRF of a carrier in New Zealand might cover <1% of the world's land area.

The NRF in 5G cellular networks keeps track of the available NFs (e.g., in a 5G core network) that can provide a specific service. Each NF carries out a registration procedure to register to the NRF when that NF goes online. NFs requiring the service of other NFs then query the NRF to discover the available NFs that can provide the requested service. For example, an AMF can query an NRF to locate a Session Management Function (SMF). Although many examples herein are given in the context of No3GPP No5G systems, other examples use DNS queries for SRV and NAPTR records to perform discovery, and use DNS servers as registry devices.

In a network with hundreds or even thousands of nodes, the serving area of the network is typically broken down into smaller regions. This can limit the geographical scope of fault domains; ease management of the network; or improve network performance. In some examples, a country can be divided into NF regions, e.g., 5-10 regions, depending on size. Regions can be sized according to population or number of subscribers in the region. For example, higher-population-density areas may be covered by geographically smaller regions than lower-population-density areas. In some examples, region assignment for purposes of registration can be orthogonal to network slicing (e.g., S-NSSAI slicing).

While this architectural approach can be applied to some network elements such as the SMF and User Plane Function (UPF), which generally exist in each region, other network elements may still have a network-wide ("global") scope, e.g. user databases such as the Unified Data Management (UDM) node. This results in a network architecture comprising Network Functions with varying topological scopes. Accordingly, various examples provide a hierarchical NRF Architecture for efficient registration and discovery of NFs that can be applied to (e.g., 5G core) networks with heterogeneous scopes, such as a mix of NFs having local and network-wide scopes. Various examples include a regional NRF and a global NRF that responds to queries from the regional NRF. For example, an AMF can query its regional NRF to find both an SMF in the region and a UDM having global scope.

Various examples manipulate interactions, e.g., lookups for NF addresses, to yield a desired result that is other than the routine and conventional sequence of events. Prior NRFs would error out when presented with an unknown NF type, but various examples herein handle NF types unknown at one (e.g., regional) registry device by falling back to another (e.g., global) registry device. Various examples distribute the load of registrations. In a full-mesh alternative, each NF would have to register individually with every NRF. For example, each global NF would have to register with each regional NRF. Moreover, in some full-mesh systems, a regional NRF is a single point of failure for network services in the corresponding region. Various examples, with fallback, can reduce network congestion and increase network robustness.

Throughout this discussion, references to a single NF or NRF also encompass multiple NFs or NRFs arranged so that one of the NFs or NRFs is active and the other(s) is (are) hot spares or other standby/backup nodes. In some examples, synchronization protocols such as those described herein with reference to operation 1214 are used between active and standby nodes.

Example embodiments described or shown herein are provided for purposes of example only. Statements made herein may be specific to a particular example embodiment (e.g., "use case"), or a specific aspect of that example embodiment, and should not be construed as limiting other example embodiments described herein. Features described with regard to one type of example embodiment may be applicable to other types of example embodiments as well. The features discussed herein are not limited to the specific usage scenarios with respect to which they are discussed.

Throughout this description, some aspects are described in terms that would ordinarily be implemented as software programs. Those skilled in the art will readily recognize that the equivalent of such software can also be constructed in hardware, firmware, or micro-code. The present description is directed in particular to algorithms and systems forming part of, or cooperating more directly with, systems and methods described herein. Aspects not specifically shown or described herein of such algorithms and systems, and hardware or software for producing and otherwise processing signals or data involved therewith, can be selected from systems, algorithms, components, and elements known in the art.

As used herein, the term "unique identifier" and similar terms encompass both truly unique identifiers (e.g., Ethernet MAC addresses that are unique by construction, or Version 1 UUIDs) and identifiers with a negligible probability of collision (non-uniqueness) (e.g., SHA256 hashes of data uniquely identifying an object, or Version 4 UUIDs).

As used herein, a "random" value can be a truly random value, e.g., measured from physical phenomena, or a pseudorandom value. Examples of random values include cryptographically-strong random numbers.

This "Overview" section is intended only to provide a brief overview of subject matter disclosed herein according to one or more illustrative embodiments, and does not serve as a guide to interpreting the claims or to define or limit scope. This section is provided to introduce illustrative features in a simplified form; these features are further described below. This section is not intended to identify key features or essential features of the claimed subject matter, nor is it intended to be used as an aid in determining the scope of the claimed subject matter. The claimed subject matter is not limited to implementations that solve any or all disadvantages noted above. The claimed subject matter is not limited to implementations that provide at least one of the results listed herein.

Subsection headers in this Detailed Description are solely for convenience in reading. Some examples include features from only one subsection. Some examples include features from more than one subsection.

Illustrative Examples

FIG. 1 shows an example telecommunication system 100 and messages according to various examples. In the illustrated example, a regional NRF recurses to a global NRF on lookups for global NFs.

A global NRF 102 receives a registration message (shown as #1) from a provider NF 104, e.g., a CHF or a UDM. The registration message #1 can be, e.g., a 5G Nnrf_NFManagement_NFRegister message indicating that provider NF 104 is available to provide services to other NFs. In some examples, provider NF 104 (or other NFs described herein) is statically configured with a network hostname or address of global NRF 102 so that provider NF 104 can announce its availability to provide services. In some examples, provider NF 104 (or other NFs described herein) is configured to register to multiple NRFs.

A consumer NF 106 can be an NF, e.g., an AMF, SMF, or PCF, that needs to access services provided by provider NF 104. Consumer NF 106 can be a regional NF, in some examples. Consumer NF 106 can send a query (#2) to a regional NRF 108. Query #2 can be, e.g., a 5G Nnrf_NFDiscovery_Request message. Query #2 can specify a network function type (referred to for brevity as an "NFType") indicating the type of NF sought. Query #2 can additionally or alternatively specify or be associated with a particular service class, e.g., name-brand, mobile virtual network operator (MVNO), or IoT.

Regional NRF 108 can determine that query #2 meets a predetermined forwarding criterion. For example, the criterion can specify that NFType=UDF, or other examples discussed below. In response, regional NRF 108 can send a query (#3) to global NRF 102. Query #3 can include an Nnrf_NFDiscovery message, DNS request for SRV/NAPTR record(s), X.500/LDAP request, or other request. Global NRF 102 can send a response (#4) to regional NRF 108. Regional NRF 108 can then send a response (#5) to consumer NF 106 in response to query #2.

In various examples of telecommunication system 100, consumer NF 106 can request services identified by NFType without needing to determine whether those services are provided by a regional NF or a global NF. This can reduce the number of connections required between NFs and NRFs (e.g., no connection is required between global NRF 102 and consumer NF 106), which can improve network robustness.

Some examples herein include fewer than all of the illustrated devices. For example, a system can include a first registry device, represented by global NRF 102, and a second registry device, represented by regional NRF 108. In some examples herein, e.g., serving roaming terminals, at least one of an SMF or a UPF can interact with an NRF in a home network, an NRF in a visited network, or both.

In some examples, global NRF 102 represents a home NRF (hNRF) used for outbound roaming, i.e., to serve customers of a first carrier who are connected to an access network not operated by a second carrier. In some of these examples, regional NRF 108 represents a visited NRF (vNRF) operated by the second carrier. For example, an AMF, vSMF, UPF, or other functions of the second carrier can register to regional NRF 108. An hSMF, UDM, or other functions provided by the first carrier can register to global NRF 102. Additionally or alternatively, global NRF 102 can represent a vNRF, and regional NRF 108 can represent an hNRF.

In some examples of outbound roaming, an AMF (consumer NF 106) can query a vNRF with, e.g., a home PLMN ID, SUPI, DNN, NSSAI, or other identifier. The vNRF (a regional NRF 108) can query an hNRF dedicated to roaming (e.g., a global NRF 102 or another regional NRF) using, e.g., the PLMN ID of SUPI, via, e.g., an NF_Discovery service, to retrieve UPF information. The hNRF can respond via the vNRF to the AMF and provide, e.g., the FQDN or IP address (or other network hostname(s) or address(es)) of available UPF(s) registered with the hPLMN.

In some examples of inbound roaming, a group of one or more Roaming hNRFs can handle NF_Discovery requests from a vNRF. For example, a vAMF can query a vNRF with a home carrier's PLMN ID, SUPI, DNN, NSSAI, or other identifier. The vNRF can query one of the hNRFs (e.g., identified using PLMN ID of SUPI) (e.g., requesting NF_Discovery service) to retrieve UPF information. The hNRF provides to the vAMF, via vNRF, the network hostname(s) or address(es) of available UPFs.

Figure 2:
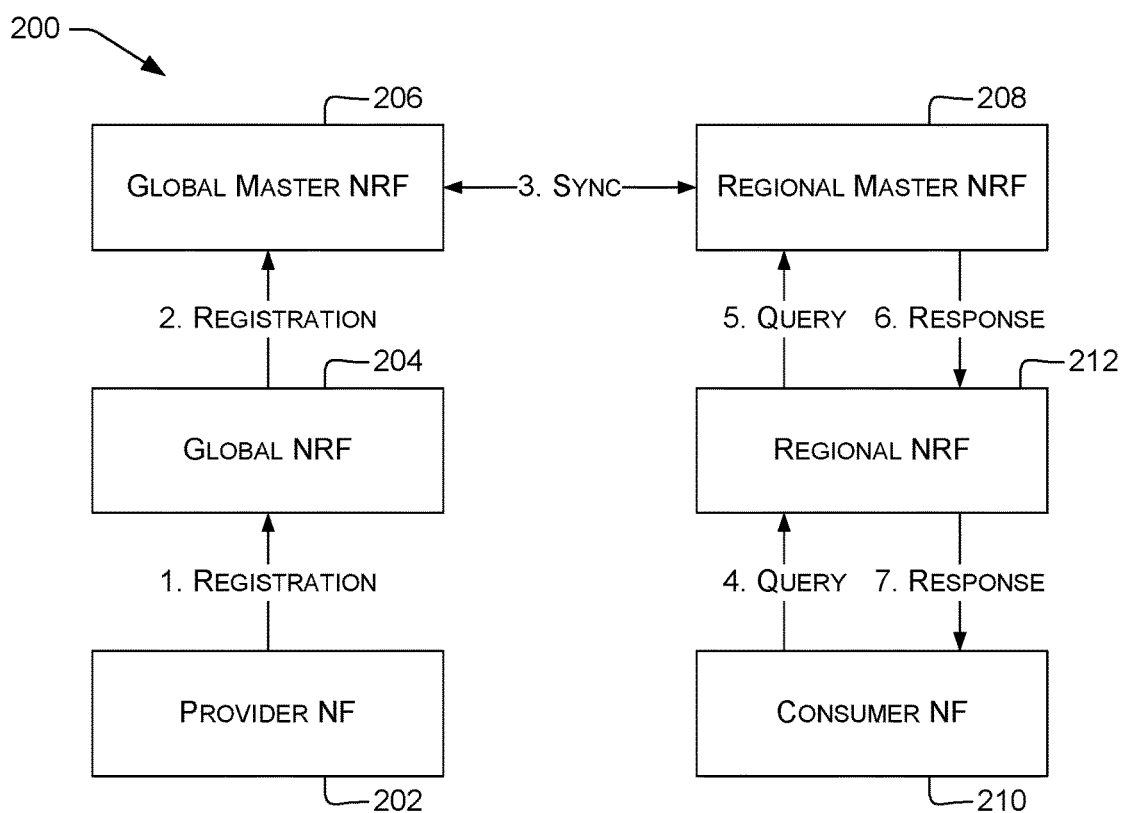
FIG. 2 shows an example network system including master NRFs, and messages, according to various examples.

FIG. 2 shows an example telecommunication system 200 and messages according to various examples. In the illustrated example, a regional NRF recurses to a regional master NRF for lookups of global NFs.

A provider NF 202 is a global NF, in this example. Provider NF 202 sends a registration message (#1) to a global NRF 204. Global NRF 204 in turn sends a registration message (#2) to a global master NRF 206. Global master NRF 206 synchronizes (#3) registration information about provider NF 202 with a regional master NRF 208. In this way, regional master NRF 208 receives information about provider NF 202 without requiring a direct connection to provider NF 202.

Consumer NF 210, in this example, is a regional NF. In order to access services associated with an NFType, consumer NF 210 can send a query (#4) to a regional NRF 212. Regional NRF 212 can determine that query #4 meets a predetermined forwarding criterion, e.g., as discussed herein with reference to FIG. 1. Regional NRF 212 can, in response, send a query (#5) to regional master NRF 208. Regional master NRF 208 can retrieve the information of provider NF 202 from a local datastore populated by the sync process (#3). Regional master NRF 208 can send this information to regional NRF 212 in a response (#6). Regional NRF 212 can, in turn, send the information to consumer NF 210 in a response (#7).

In various examples of telecommunication system 100, consumer NF 106 can request services identified by NFType without needing to determine whether those services are provided by a regional NF or a global NF. This can reduce the number of connections required between NFs and NRFs, which can improve network robustness as discussed above. Moreover, the use of sync (#3) can permit regional master NRF 208 to respond to queries related to provider NF 202 even if global master NRF 206 is temporarily inaccessible.

Some examples herein include fewer than all of the illustrated devices. For example, a system can include a first registry device, represented by global master NRF 206, and a second registry device, represented by regional master NRF 208. A system can additionally include a third registry device, represented by regional NRF 212, in some examples. A system can additionally include a fourth registry device, represented by global NRF 204, in some examples. Some examples include first, second and third registry devices. Some examples include first, second, and fourth registry devices. Some examples include first, second, third, and fourth registry devices.

In some examples, global NRF 204 represents a home NRF (hNRF) used for outbound roaming. In some of these examples, regional NRF 212 represents a visited NRF (vNRF) operated by the second carrier. For example, an AMF, UPF, or other functions of the visited carrier can register to regional NRF 212. An SMF, UPF, or other functions provided by the home carrier can register to global NRF 204. Additionally or alternatively, global NRF 204 can represent a vNRF, and regional NRF 212 can represent an hNRF.

In some examples of roaming in systems such as those depicted in FIGS. 1 and 2, transfers such as FIGS. 1 #3 and #4 and FIG. 2 #3 pass through one or more Security Edge Protection Proxies (SEPPs), e.g., one the edge of each roaming partner.

Some examples of systems such as those depicted in FIGS. 1 and 2 use caching, e.g., of registration information at regional NRFs 108, 212 or other registry devices. For example, registration information can be cached until a time-to-live (TTL) expires, e.g., a TTL of 3600 s. In some examples of systems such as those depicted in FIGS. 1 and 2, NFs periodically exchange heartbeat packets with NRFs. If an NRF becomes inaccessible to an NF, that NF can register with a different NRF. If an NF becomes inaccessible to an NRF, that NRF can mark that NF's registration as suspended, or can remove or revoke the registration. The registration can be returned to pre-outage status once heartbeat packets are once again successfully exchanged.

Illustrative Data-Processing System(s)

Figure 3:
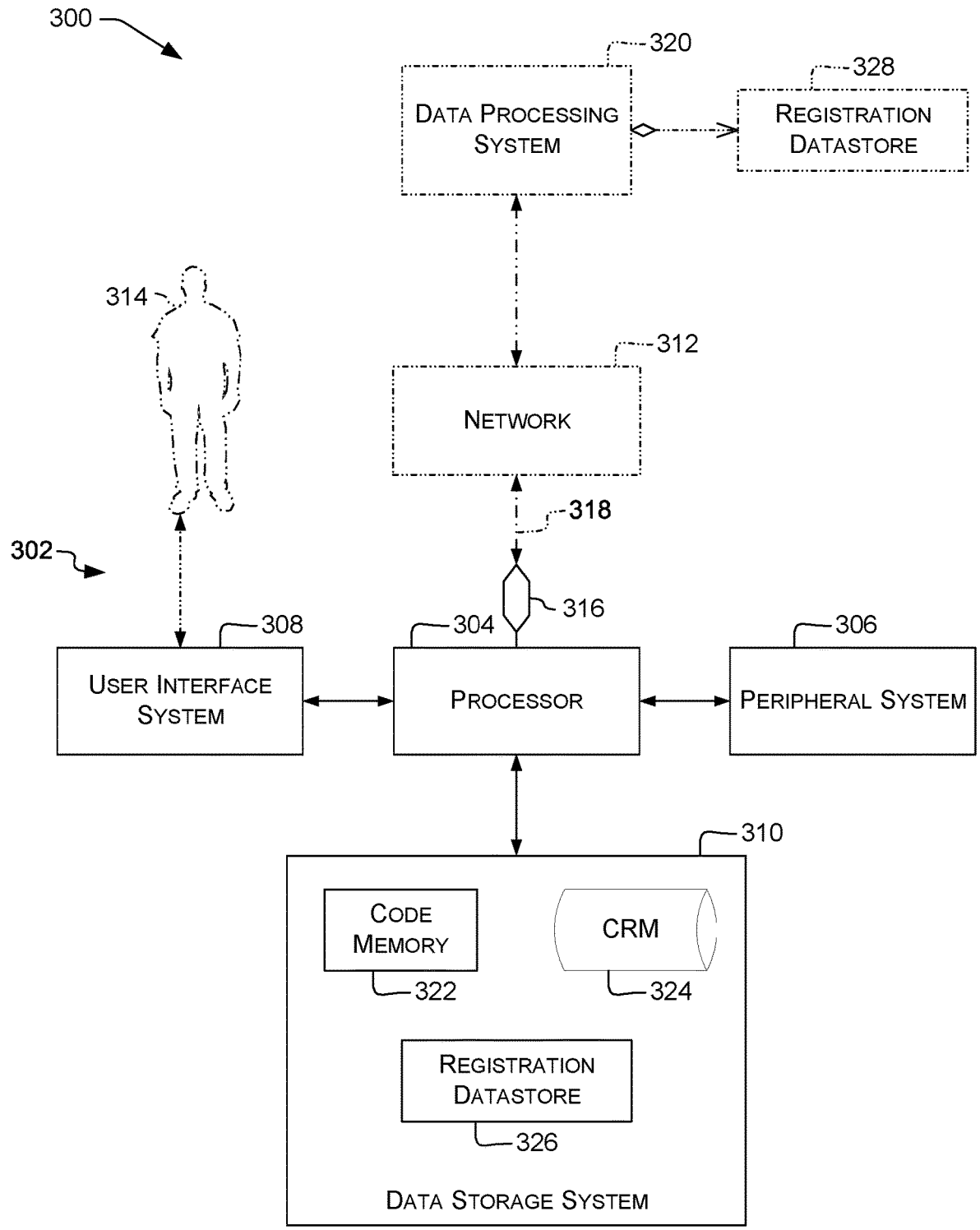
FIG. 3 is a high-level diagram showing the components of a data-processing system.

FIG. 3 is a high-level diagram 300 showing the components of an example data-processing system 302 for analyzing data and performing other analyses described herein, and related components. The system 302 includes a processor 304, a peripheral system 306, a user interface system 308, and a data storage system 310. The peripheral system 306, the user interface system 308, and the data storage system 310 are communicatively connected to the processor 304. Processor 304 can be communicatively connected to network 312 (shown in phantom), e.g., the Internet, a leased line, or a cellular network, as discussed below. Network 312 can be an example of an internetwork, such as the public Internet or a private IPX network. Terminals, nodes of a serving network, nodes of a home network, NFs 104, 106, 202, or 210, NRFs 102, 108, 204, 206, 208, or 212, or other network nodes described herein can each include one or more of subsystems 304, 306, 308, 310, and can each connect to one or more network(s) 312. Processor 304, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Some example systems and techniques described herein can permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks, such as network 312 or a component thereof, may include an application network (e.g., an Internet Protocol, IP, Multimedia Subsystem, IMS, network) or a core network (e.g., a 5G core) operated by one or more service providers ("carriers"), such as one or more cellular-telephony providers. The application network can be connected via access networks, e.g., a serving network or a home network, to terminals. Terminals can be operated by users ("subscribers"), or can be autonomous. Example access networks carrying traffic of sessions can include second-generation (2G), third-generation (3G), or fourth-generation (4G) cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as Institute of Electrical and Electronics Engineers (IEEE) 802.11 (WIFI), 802.15.1 (BLUETOOTH), or 802.16 (WIMAX) networks carrying voice over Internet Protocol (VoIP) (e.g., VoWIFI) calls.

Some examples can include or be interoperable with Long Term Evolution (LTE) or 3GPP fifth-generation New Radio (5G NR) cellular networks, or any future IP-based cellular networks, carrying Voice over LTE (VoLTE) sessions using Session Initiation Protocol (SIP) signaling. In some examples, the network 312 can provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

Processor 304 can implement processes of various aspects described herein. Processor 304 and related components can, e.g., carry out processes for registering to an NRF; receiving and processing registrations; querying an NRF; determining whether a particular type of NF is registered at an NRF; determining whether queries match forwarding criteria; or forwarding or proxying queries from regional NRFs to global NRFs, or from NRFs to master NRFs.

Processor 304 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 306, user interface system 308, and data storage system 310 are shown separately from the processor 304 but can be stored completely or partially within the processor 304.

The peripheral system 306 can include or be communicatively connected with one or more devices configured or otherwise adapted to provide digital content records to the processor 304 or to take action in response to processor 304. For example, the peripheral system 306 can include digital still cameras, digital video cameras, cellular phones, or other data processors. The processor 304, upon receipt of digital content records from a device in the peripheral system 306, can store such digital content records in the data storage system 310.

The user interface system 308 can convey information in either direction, or in both directions, between a user 314 and the processor 304 or other components of system 302. The user interface system 308 can include a mouse, a keyboard, another computer (connected, e.g., via a network or a null-modem cable), or any device or combination of devices from which data is input to the processor 304. The user interface system 308 also can include a display device, a processor-accessible memory, or any device or combination of devices to which data is output by the processor 304. The user interface system 308 and the data storage system 310 can share a processor-accessible memory.

In various aspects, processor 304 includes or is connected to communications interface 316 that is coupled via network link 318 (shown in phantom) to network 312. Network link 318 can include a wired or wireless communication connection. For example, communications interface 316 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communications interface 316 sends and receives electrical, electromagnetic, or optical signals that carry digital or analog data streams representing various types of information across network link 318 to network 312. Network link 318 can be connected to network 312 via a switch, gateway, hub, router, or other networking device.

In various aspects, system 302 can communicate, e.g., via network 312, with a data processing system 320, which can include the same types of components as system 302 but is not required to be identical thereto. Systems 302, 320 can be communicatively connected via the network 312. Each system 302, 320 can execute computer program instructions to perform operations described herein. For example, system 302 can be an NRF, and system 320 can be an NF registering to the NRF. Additionally or alternatively, one of systems 302, 320 can be a regional NRF, and the other of systems 302, 320 can be a global NRF. Additionally or alternatively, one of systems 302, 320 can be an NRF (e.g., NRF 204, 212), and the other of systems 302, 320 can be a corresponding master NRF (e.g., NRF 206, 208, respectively).

Processor 304 can send messages and receive data, including program code, through network 312, network link 318, and communications interface 316. For example, a server can store requested code for an application program (e.g., a JAVA applet) on a tangible non-volatile computer-readable storage medium to which it is connected. The server can retrieve the code from the medium and transmit it through network 312 to communications interface 316. The received code can be executed by processor 304 as it is received, or stored in data storage system 310 for later execution.

Data storage system 310 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 304 can transfer data (using appropriate components of peripheral system 306), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 310 can be a tangible non-transitory computer-readable storage medium, i.e., a non-transitory device or article of manufacture that participates in storing instructions that can be provided to processor 304 for execution. In some examples, one of the processor-accessible memories in the data storage system 310 can be a non-volatile memory in a Subscriber Identity Module (SIM) card.

In an example, data storage system 310 includes code memory 322, e.g., a random-access memory (RAM), and computer-readable medium (CRM) 324, e.g., a tangible computer-readable medium (e.g., a hard drive or other rotational storage device, or a Flash drive or other nonvolatile storage device). Computer program instructions are read into code memory 322 from CRM 324. Processor 304 then executes one or more sequences of the computer program instructions loaded into code memory 322, as a result performing process steps described herein. In this way, processor 304 carries out a computer implemented process. For example, steps of methods described herein, blocks of the flowchart illustrations or block diagrams herein, and combinations of those, can be implemented by computer program instructions. Code memory 322 can also store data, or can store only code. In some examples, e.g., using high-speed nonvolatile memory, CRM 324 also functions as code memory 322, and a separate code memory 322 is not used.

In the illustrated example, data storage system 310 includes a registration datastore 326. Registration datastore 326 can be, include, or be embodied in a dedicated memory, or a portion of another memory (e.g., CRM 324). Registration datastore 326 can store information of NFs, e.g., network addresses and NFTypes. Processor 304 can update information in registration datastore 326, e.g., in response to registration messages such as FIG. 1 #1 and FIG. 2 #1.

In the illustrated example, system 320 also includes a registration datastore 328. For example, systems 302, 320 can represent NRFs 206, 208, respectively. Accordingly, each system 302, 320 can have its own respective registration datastore 326, 328, and the systems 302, 320 can synchronize their registration datastore 326, 328 via network link 318.

In the illustrated example, systems 302 or 320 can be computing nodes in a cluster computing system, e.g., a cloud service or other cluster system ("computing cluster" or "cluster") having several discrete computing nodes (systems 302, 320) that work together to accomplish a computing task assigned to the cluster as a whole. In some examples, at least one of systems 302, 320 can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least one of systems 302, 320 can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, RAM space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 304 (and possibly also other processors), and that, when loaded into processor 304, cause functions, acts, or operational steps of various aspects herein to be performed by processor 304 (or other processor). Computer program code for carrying out operations for various aspects described herein may be written in any combination of one or more programming language(s), and can be loaded from CRM 324 into code memory 322 for execution. The program code may execute, e.g., entirely on processor 304, partly on processor 304 and partly on a remote computer connected to network 312, or entirely on the remote computer.

In some examples, a "control unit" as described herein includes processor 304. A control unit can also include, if required, data storage system 310 or portions thereof. For example, a control unit can include a CPU or DSP (processor 304), and can include a computer storage medium or other tangible, non-transitory computer-readable medium storing instructions executable by that CPU or DSP to cause that CPU or DSP to perform functions described herein. Additionally or alternatively, a control unit can include an ASIC, FPGA, or other logic device(s) wired (e.g., physically or via blown fuses or logic-cell configuration data) to perform functions described herein. In some example of control units including ASICs or other devices physically configured to perform operations described herein, a control unit does not include computer-readable media (e.g., CRM 324) storing processor-executable instructions.

Illustrative Operations

FIG. 4 is a dataflow diagram illustrating an example process 400 for providing a network address of an NF, and related data items. For clarity, dataflow is shown dashed throughout FIGS. 4-22. Process 400 can be performed, e.g., by a registry device such as a global NRF 102 of a telecommunication system 100. The registry device can include communications interface 316 and registration datastore 326, e.g., held in CRM 324 or other component of data-storage system 310.

The registry device can include at least one processor 304 and at least one code memory 322, or another control unit. In some examples, the registry device includes control unit(s) configured to perform operations of process 400, e.g., in response to computer program instructions.

Operations shown in FIG. 4 and in FIGS. 5-22, discussed below, can be performed in any order except when otherwise specified, or when data from an earlier step is used in a later step. For clarity of explanation, reference is herein made to various components shown in FIGS. 1-3 that can carry out or participate in the steps of the example methods. It should be noted, however, that other components can be used; that is, example method(s) shown in FIGS. 4-22 are not limited to being carried out by the identified components, and are not limited to including the identified operations or messages.

Some operations herein are mutually independent, i.e., neither requires as input any output of the other. Operations described herein as "mutually independent" (e.g., within a group of operations such as those of a method) can be performed in either order, in parallel, at least partly overlapping in time, or partly or wholly as a combined operation, in various examples. A later-run operation of two mutually independent operations may accept input(s) from the earlier-run of the two mutually independent operations, but is not required to wait for those input(s) or for completion of the earlier-run operation before executing.

At 402, the control unit can receive, via communications interface 316, a registration message 404 from an NF, e.g., a global NF such as provider NF 104. Registration message 404 can specify a network address 406 associated with the NF and an NFType 408 associated with the NF. For example, registration message 404 can be an Nnrf_NFManagement_NFRegister message (29.510 v15.1.0 § 5.2.2.2). Network address 406 can include a string fully-qualified domain name (FQDN), or an IPv4, IPv6, or other network address represented, e.g., in binary or string form. For example, the IPv4 loopback can be represented in binary form as 0x7f000001 or in string form as "127.0.0.1". NFType 408 can include a string, e.g., "UDM".

At 410, the control unit can add a registration 412 to the registration datastore 326 in response to the registration message 404. The registration 412 can associate the NFType 408 with the network address 406. For example, the control unit can perform an SQL INSERT or UPDATE, or a corresponding operation on a NoSQL database, to add network address 406, NFType 408, and an association between them into registration datastore 326. In some examples, network address 406 and NFType 408 are associated by virtue of being stored in a single record.

At 414, the control unit can receive, via the communications interface 316, a request 416. Request 416 can be received, e.g., from a second registry device (e.g., different from the registry device performing process 400). For example, request 416 can represent query #3, FIG. 1, and the second registry device can be regional NRF 108. Request 416 can specify an NFType 418. For example, request 416 can be an Nnrf_NFDiscovery_NFDiscover request (29.510 § 5.3.2.2) including a string NFType 418.

At 420, the control unit can retrieve the network address 406 from the registration 412 based at least in part on NFType 418. In some examples, operation 420 is performed in response to NFType 418 matching NFType 408. For example, the control unit can run an SQL SELECT or other database query based on NFType 418 to return any records for which the respective NFType (e.g., NFType 408) matches (e.g., by string equality) NFType 418.

At 422, the control unit can send, via the communications interface 316, the network address 406 to the second registry device. For example, the control unit can send a message 424 carrying the network address 406. In some examples, message 424 can include an HTTP 200 OK response to an Nnrf_NFDiscovery_NFDiscover request. The HTTP 200 OK response can include an nfInstances array having one or more elements. At least one element can include network address 406.

FIG. 5 is a dataflow diagram illustrating an example process 500 performed by a network registry device for relaying a discovery request, and related data items. In some examples, a registry device, e.g., a regional NRF such as regional NRF 108, includes control unit(s) configured to perform operations described below, e.g., in response to computer program instructions. The registry device can include a communications interface 316 and a CRM 324 (or other component of data storage system 310). In some examples, CRM 324 can store a forwarding criterion 502. In some examples, operation 510 is performed before operation 414, or operation 422 is performed before operation 512.

At 504, the control unit can receive, via the communications interface 316, a request 506 for a network address associated with a NF. For example, request 506 can include a query from a regional NF, such as consumer NF 106. Request 506 can specify an NFType 418. For example, request 506 can include an Nnrf_NFDiscovery_NFDiscover request. Examples are discussed herein, e.g., with reference to operation 414.

At 508, the control unit can determine that the NFType 418 meets the forwarding criterion 502. For example, the control unit can execute instructions of a procedural forwarding criterion 502, or apply filters of a declarative forwarding criterion 502 (e.g., an LDAP query) to the NFType 418.

In some examples, the control unit is configured to forward specific NFTypes. The forwarding criterion 502 specifies (in procedural or declarative form) a predetermined set of NFTypes. Operation 508 includes determining that NFType 418 meets the forwarding criterion 502 at least partly by determining that the NFType 418 is included in the set of NFTypes. For example, forwarding criterion 502 can include code to perform string comparisons of NFType 418 against each NFType in the set of NFTypes. Additionally or alternatively, forwarding criterion 502 can be included or embodied in a hash table or database table permitting lookup by NFType 418 to determine whether NFType 418 is included in the set.

In some examples, the control unit is configured to forward a request for an NFType 418 for which no NFs are registered directly with the registry device, e.g., the regional NRF 108. For example, if an AMF is registered with the registry device, the control unit can respond directly to a query for an AMF, without executing operation 510 or 512. However, if no UDM is registered with the registry device, the control unit can forward queries for a UDM using operation 510. Some examples of forwarding criteria are discussed below with reference to FIG. 7.

At 510, the control unit can send, via the communications interface 316, a second request 416 for the network address associated with the NF to another registry device, e.g., a global NRF such as global NRF 102. The second request 416 can specify the NFType 418. The second request 416 can include an Nnrf_NFDiscovery_NFDiscover request or other request described herein. Operation 510 can be performed in response to the determination at operation 508. Examples are discussed herein, e.g., with reference to operation 414.

At 512, the control unit can receive, via the communications interface 316, the first network address 406. For example, the control unit can receive an Nnrf_NFDiscovery_NFDiscover HTTP 200 OK reply or other message 424. Examples are discussed herein, e.g., with reference to operation 422.

At 514, the control unit can send, via the communications interface 316, a reply 516 to the request 506. Reply 516 can include the network address 406. Reply 516 can include an Nnrf_NFDiscovery_NFDiscover HTTP 200 OK reply or other reply. Examples are discussed herein, e.g., with reference to operation 422.

In some examples, a system includes a first registry device (e.g., global NRF 102) configured to perform process 400, and a second registry device (e.g., regional NRF 108) configured to perform process 500. In some of these examples, request 416 is sent at operation 510 and received at operation 414. Message 424 carrying network address 406 is sent at operation 422 and received at operation 512. However, these examples are not limiting. Some examples include a system that performs process 400 but not process 500, or process 500 but not process 400.

In some examples, a first registry device configured to perform process 400 comprises a first NRF. A second registry device configured to perform process 500 comprises a second NRF. An NF associated with network address 406 and NFType 408 comprises at least one of: a CHF, a UDM, an SMF, or a UPF.

Figure 6:
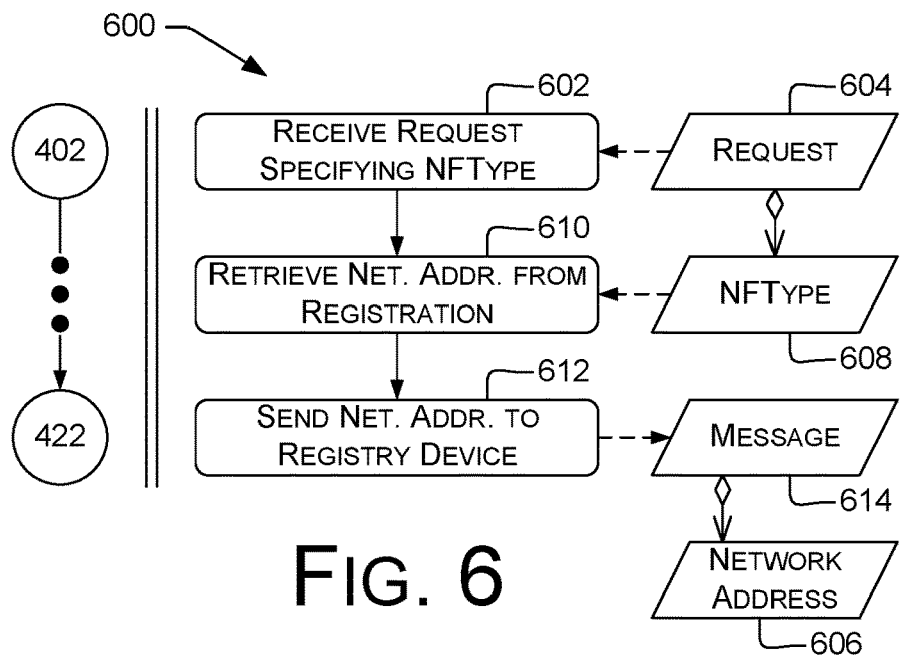
FIG. 6 is a dataflow diagram illustrating an example process for providing a network address of an NF (e.g., at a global registry device to a global NF), and related data items, according to various examples.

FIG. 6 is a dataflow diagram illustrating an example process 600 performed by a network registry device for providing a network address, and related data items. In some examples, a registry device, e.g., a global NRF such as global NRF 102, includes control unit(s) configured to perform operations described below, e.g., processor(s) 304. In some examples, operations 602-612 are mutually independent of operations 402-422. In some examples, a registry device is configured to perform both process 400 and process 600.

In some examples, global NFs may need to communicate with other global NFs. For example, provider NF 104 may need to communicate with another NF that is registered to global NRF 102. Some of these examples use operations 602-612.

At 602, the control unit can receive a request 604 for a network address 606 associated with a second NF. Request 604 can specify a second NFType 608. Request 604 can be received via communications interface 316 and from the first NF, e.g., provider NF 104. For example, request 604 can be a query from the first NF. Examples are discussed herein, e.g., with reference to operation 414.

At 610, the control unit can retrieve the network address 606 from the registration datastore 326 based at least in part on the second NFType 608. Examples are discussed herein, e.g., with reference to operation 420.

At 612, the control unit can send, via the communications interface 316, the network address 606 to the first NF (e.g., the sender of request 604). For example, the control unit can send a message 614 carrying network address 606. Examples are discussed herein, e.g., with reference to operation 422.

Figure 7:
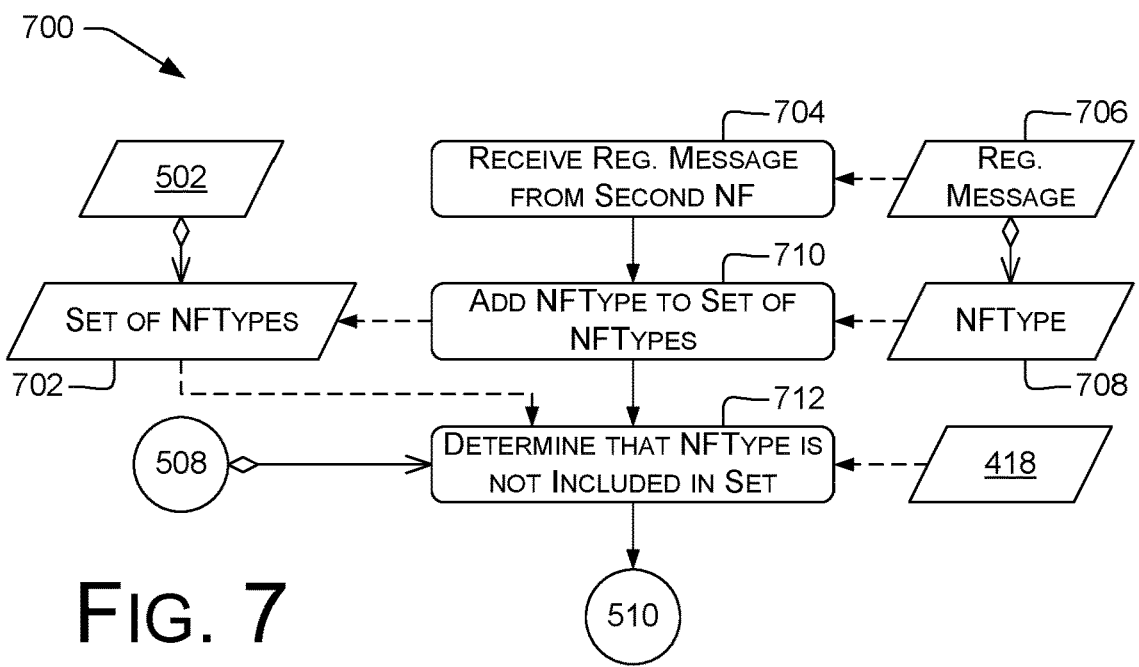
FIG. 7 is a dataflow diagram illustrating an example process for forwarding a network-address request, and related data items, according to various examples.

FIG. 7 is a dataflow diagram illustrating example processes 700 performed by a network registry device for forwarding a network-address request, and related data items. In some examples, a registry device, e.g., a regional NRF such as regional NRF 108, includes control unit(s) configured to perform operations described below, e.g., processor(s) 304. In some examples, at least: operation 508 can include operation 712; or operation 712 can precede operation 510.

In some examples, a regional NRF is configured to forward discovery requests for NFTypes not registered in the regional NRF. For example, the forwarding criterion 502 can include (data indicating) a set 702 of NFTypes. The set 702 can be represented as a hash, a database table, or another data structure, e.g., providing <O(N) testing of whether an element is present in the set 702. The set 702 can be empty or nonempty.

At 704, the control unit can receive, via the second communications interface, a second registration message 706 from a second NF. The registration message 706 can specify a second NFType 708 associated with the second NF. Examples are discussed herein, e.g., with reference to operation 402. For example, the second NF can be a regional NF, such as an SMF.

At 710, the control unit can add the second NFType 708 to the set 702 of NFTypes. Examples are discussed herein, e.g., with reference to operation 410. For example, a hash can be updated to include the second NFType 708 as a key, or an SQL INSERT or other database statement can be executed to add the second NFType 708 to a database table. Operations 704 and 710 can be performed one or more times, as a result of which set 702 represents the NFTypes of registered regional NF(s).

At 712, the control unit can determine that the first NFType 418 meets the forwarding criterion 502 at least partly by determining that the first NFType 418 is not included in the set 702 of NFTypes. Operation 712 can be performed after operation 710, in some examples. For example, the control unit can determine that any request for an NF not registered in a region (e.g., not registered to regional NRF 108) should be handled by a global registry device (e.g., global NRF 102). Operation 712 can include, e.g.: determining that the first NFType 418 is not a key in a hash representing set 702; searching a table (in or embodying set 702) using the first NFType 418 and determining that no records were returned; or otherwise determining that a data structure representing set 702 does not include an indication that first NFType 418 is in set 702 (e.g., omits first NFType 418, or includes an indication that first NFType 418 is not in set 702).

Figure 8:
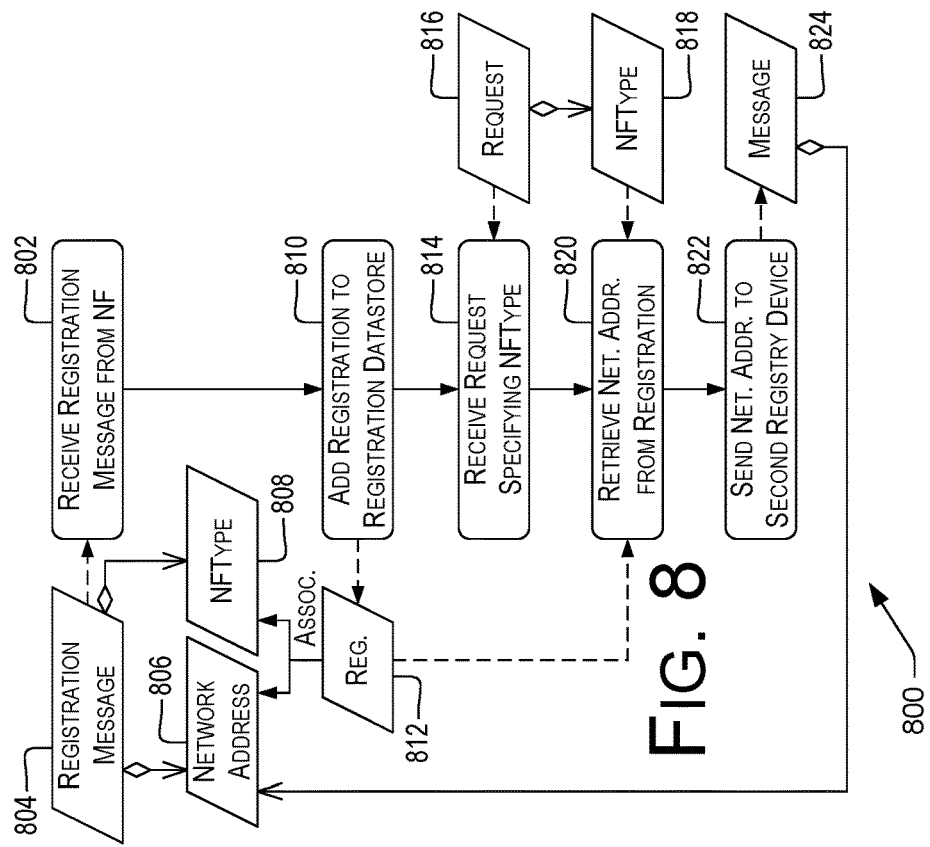
FIG. 8 is a dataflow diagram illustrating an example process for providing a network address of an NF (e.g., at a global registry device), and related data items, according to various examples.

FIG. 8 is a dataflow diagram illustrating an example process 800 for providing a network address of an NF, and related data items. Process 800 can be performed, e.g., by a registry device such as a global NRF 102 of a telecommunication system 100. The registry device can include communications interface 316 and registration datastore 326, e.g., held in CRM 324 or other component of data-storage system 310.

The registry device can include at least one processor 304 and at least one code memory 322, or another control unit. In some examples, the registry device includes control unit(s) configured to perform operations of process 800, e.g., in response to computer program instructions.

At 802, the control unit can receive, via the first communications interface, a registration message 804 from a first NF. Registration message 804 can specify a first network address 806 associated with the first NF and a first network function type (NFType) 808 associated with the first NF. Examples are discussed herein, e.g., with reference to operation 402.

At 810, the control unit can add a registration 812 to the first registration datastore 326 in response to the registration message 804. The registration 812 can associate the first NFType 808 with the first network address 806. Examples are discussed herein, e.g., with reference to operation 410.

At 814, the control unit can receive, via the first communications interface, a request 816. Request 816 can specify an NFType 818. Request 816 can be sent by a second registry device, e.g., a regional NRF 108. Examples are discussed herein, e.g., with reference to operation 414.

At 820, the control unit can retrieve the first network address 806 from the registration 812 based at least in part on the first NFType 818 in the request 816. Examples are discussed herein, e.g., with reference to operation 420.

At 822, the control unit can send, via the first communications interface, the first network address 806 to the second registry device or other device from which the request 816 was received. For example, the control unit can send a message 824 carrying or otherwise indicating the network address 806. Examples are discussed herein, e.g., with reference to operation 422.

Figure 9:
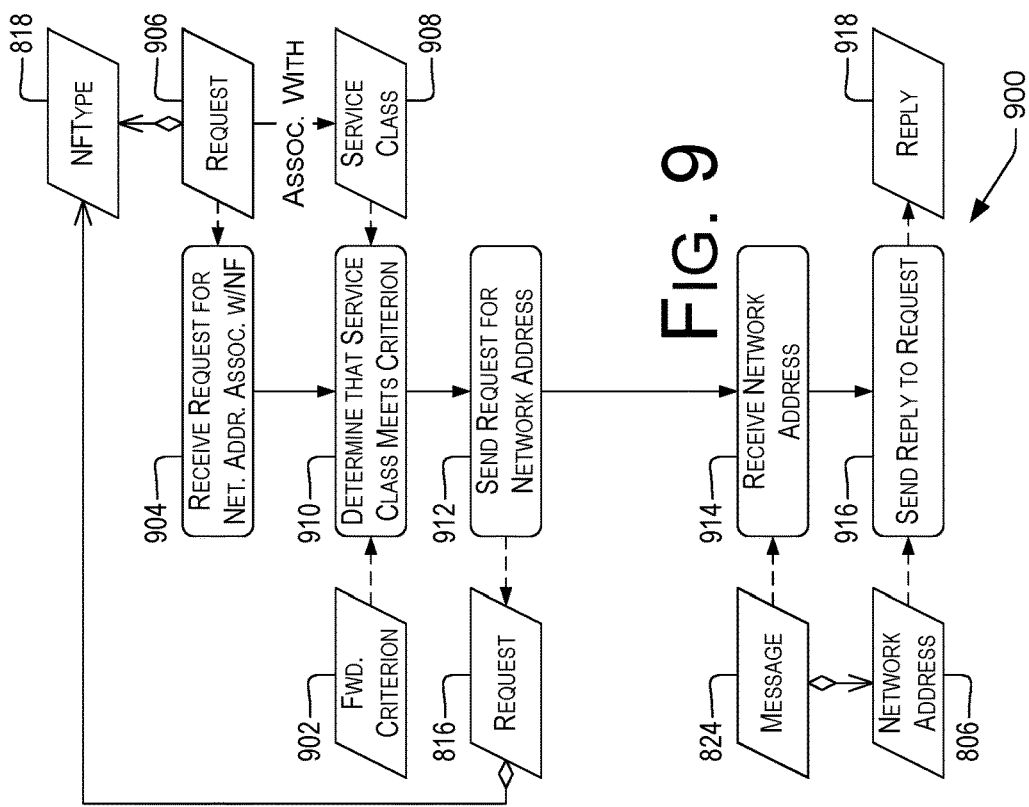
FIG. 9 is a dataflow diagram illustrating an example process for providing a network address of an NF (e.g., at a regional registry device and based on a service class), and related data items, according to various examples.

FIG. 9 is a dataflow diagram illustrating an example process 900 performed by a network registry device for relaying a discovery request, and related data items. In some examples, a registry device, e.g., a regional NRF such as regional NRF 108, includes control unit(s) configured to perform operations described below, e.g., in response to computer program instructions. The registry device can include a communications interface 316 and a CRM 324 (or other component of data storage system 310). In some examples, CRM 324 can store a forwarding criterion 902. In some examples, operation 912 is performed before operation 814, or operation 822 is performed before operation 914.

At 904, the control unit can receive, via the second communications interface, a first request 906 for a network address associated with an NF. First request 906 can be, e.g., a query from a regional NF such as consumer NF 106. First request 906 can specify the first NFType 818 and be associated with (e.g., include or be accompanied by data indicating) a first service class 908. Examples are discussed herein, e.g., with reference to operation 504.

Service class 908 can include data indicating a particular registry device that should service request 906. For example, service class 908 can include a network name or address of global NRF 102. Additionally or alternatively, service class 908 can include an index or other identifier that the control unit uses to determine a network name or address of the registry device that should service request 906. For example, service class 908 can include a string such as (or enumerated value representing) "MVNO," "IoT," "PAPN" (Private APN), or other service classes. Additionally or alternatively, service class 908 can indicate a network slice associated with request 906, e.g., by including an S-NSSAI. Additionally or alternatively, service class 908 can indicate a carrier associated with request 906, e.g., the network operator implementing NF(s) or NRF(s), or an MVNO. Additionally or alternatively, service class 908 can indicate whether a terminal is operating in a home access network thereof or is roaming. Additionally or alternatively, service class 908 can indicate a service grade, service-level agreement (SLA), or set of service expectations, e.g., service to people vs. service to IoT devices. In some examples, the service class 908 comprises at least one of: an MVNO service class, an IoT service class, a roaming service class, or a PAPN service class. In some examples, a PAPN represents a private data network connected to a core network, e.g., a cellular core network, via an interface such as 3GPP Gi or SGi.

At 910, the control unit can determine that the service class 908 meets the forwarding criterion 902. For example, the control unit can search a database table or other preloaded datastore of service classes to be forwarded, and determine that the service class 908 is included in the table. Additionally or alternatively, the control unit can determine that service class 908 is excluded from a datastore of service classes to be handled locally. Techniques for checking NFType 418 described herein with reference to operation 508 or FIG. 7 can additionally or alternatively be used to check service class 908.

In some examples, the forwarding criterion 902 specifies (e.g., in code or data) a predetermined set of service classes. In some of these examples, operation 910 includes determining that the service class 908 meets the forwarding criterion 902 at least partly by determining that the service class 908 is included in the set of service classes.

At 912, the control unit can send, via the second communications interface, a second request 816 for the network address associated with the NF to another registry device, the second request specifying the first NFType 818. Operation 912 can be performed in response to the determination at operation 910. Examples are discussed herein, e.g., with reference to operation 510.

At 914, the control unit can receive, via the second communications interface, the first network address 806. For example, the control unit can receive a message 824. Examples are discussed herein, e.g., with reference to operation 512.

At 916, the control unit can send, via the second communications interface, a reply 918 to the first request 906. Reply 918 can include the first network address 806. Examples are discussed herein, e.g., with reference to operation 514.

In some examples, a system includes a first registry device (e.g., global NRF 102) configured to perform process 800, and a second registry device (e.g., regional NRF 108) configured to perform process 900. In some of these examples, request 816 is sent at operation 912 and received at operation 814. Message 824 carrying network address 806 is sent at operation 822 and received at operation 914. However, these examples are not limiting. Some examples include a system that performs process 800 but not process 900, or process 900 but not process 800.

In some examples, a first registry device configured to perform process 800 comprises a first NRF. A second registry device configured to perform process 900 comprises a second NRF. An NF associated with network address 806 and NFType 808 comprises at least one of: a CHF, a UDM, an SMF, or a UPF.

Figure 10:
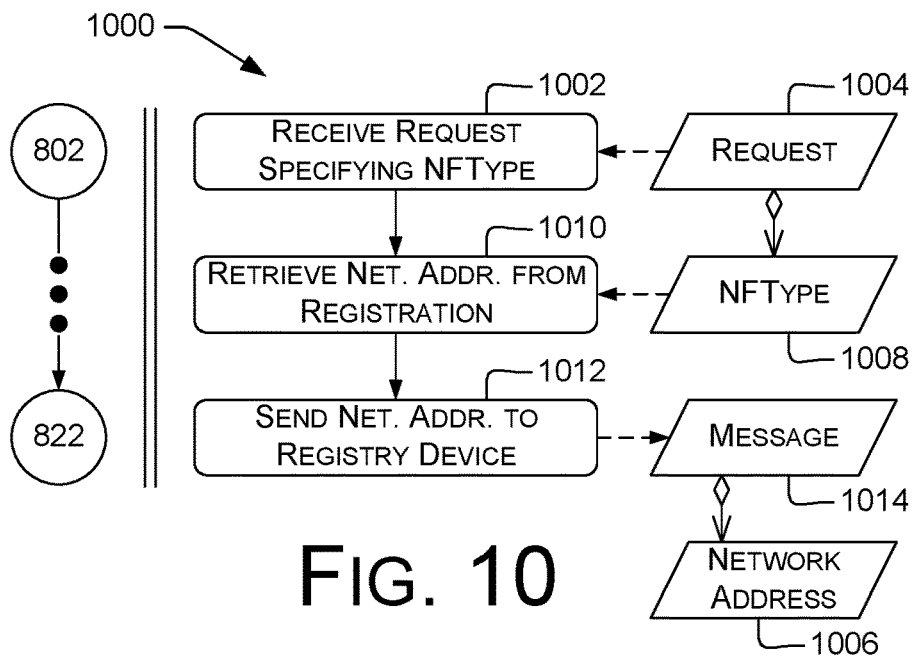
FIG. 10 is a dataflow diagram illustrating an example process for providing a network address of an NF (e.g., at a global registry device to a global NF), and related data items, according to various examples.

FIG. 10 is a dataflow diagram illustrating an example process 1000 performed by a network registry device for providing a network address, and related data items. In some examples, a registry device, e.g., a global NRF such as global NRF 102, includes control unit(s) configured to perform operations described below, e.g., processor(s) 304. In some examples, operations 1002-1012 are mutually independent of operations 802-822. In some examples, a registry device is configured to perform both process 800 and process 1000.

In some examples, global NFs may need to communicate with other global NFs. For example, provider NF 104 may need to communicate with another NF that is registered to global NRF 102. Some of these examples use operations 602-612.

At 1002, the control unit can receive, via the second communications interface from the first NF, a third request 1004 (e.g., a query from a global NRF) for a second network address 1006 associated with a second NF. Third request 1004 can specify a second NFType 1008. Examples are discussed herein, e.g., with reference to operation 602.

At 1010, the control unit can retrieve the second network address 1006 from the registration datastore 326 based at least in part on the second NFType 1008. Examples are discussed herein, e.g., with reference to operation 610.

At 1012, the control unit can send, via the first communications interface to the first NF, the second network address to the first NF. For example, the control unit can send a message 1014 including the network address 1006. Examples are discussed herein, e.g., with reference to operation 612.

Figure 11:
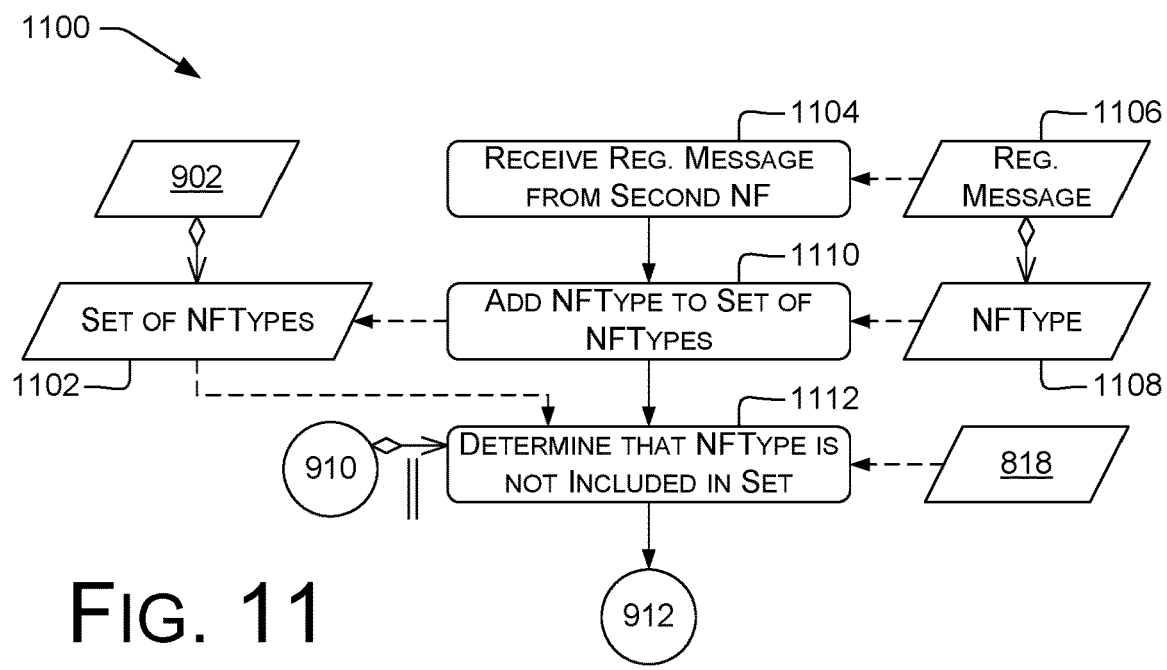
FIG. 11 is a dataflow diagram illustrating an example process for forwarding a network-address request, and related data items, according to various examples.

FIG. 11 is a dataflow diagram illustrating example processes 1100 performed by a network registry device for forwarding a network-address request, and related data items. In some examples, a registry device, e.g., a regional NRF such as regional NRF 108, includes control unit(s) configured to perform operations described below, e.g., processor(s) 304. In some examples, at least: operation 910 can include operation 1112; or operation 1112 can precede operation 912.

In some examples, a regional NRF is configured to forward discovery requests based on NFType in addition to based on service class 908. For example, the regional NRF can forward requests for NFTypes not registered in the regional NRF regardless of service class (Service Class OR NFType), or for such NFTypes that additionally meet service-class criteria (Service Class AND NFType). For example, the forwarding criterion 902 can include (data indicating) a set 1102 of NFTypes (which can represent set 702). The set 1102 can be represented as any data structure described herein, e.g., providing <O(N) testing of whether an element is present in the set 1102. The set 1102 can be empty or nonempty.

In some examples, the control unit is configured to forward a request for an NFType 1108 for which no NFs are registered directly with the registry device, e.g., the regional NRF 108. For example, if an AMF is registered with the registry device, the control unit can respond directly to a query for an AMF, without executing operation 912 or 914. However, if no UDM is registered with the registry device, the control unit can forward queries for a UDM using operation 912.

At 1104, the control unit can receive, via the second communications interface, a second registration message 1106 from a second NF. The registration message 1106 can specify a second NFType 1108 associated with the second NF. Examples are discussed herein, e.g., with reference to operation 704.

At 1110, the control unit can add the second NFType 1108 to the set 1102 of NFTypes. Examples are discussed herein, e.g., with reference to operation 710.

At 1112, the control unit can determine that the first NFType 818 meets the forwarding criterion at least partly by determining that the first NFType 818 is not included in the set 1102 of NFTypes. Examples are discussed herein, e.g., with reference to operation 712.

Operation 1112 can be followed by operation 912, in some examples. For example, the control unit can send the request 816 further in response to the determination at operation 1112 that the first NFType 818 meets the forwarding criterion 902. This is an example of the AND operation described above. Alternatively, operations 910 and 1112 can be mutually independent (as indicated by the double vertical line), and operation 912 can be carried out in response to a determination at either or both of operation 910 or operation 1112. This is an example of the OR operation described above.

Figure 12:
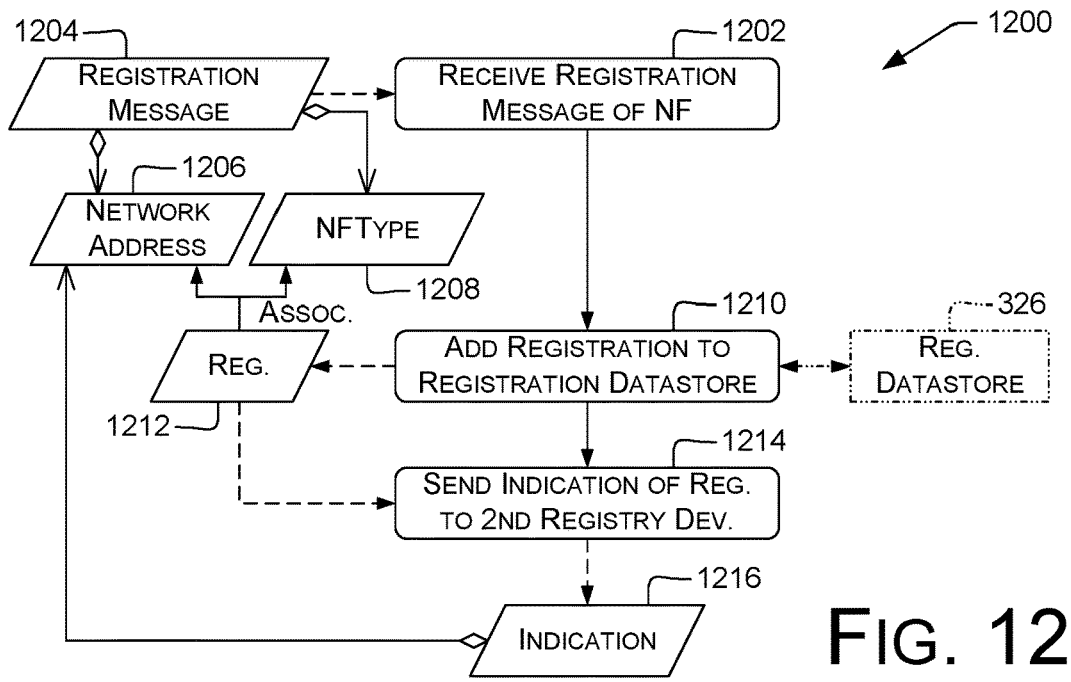
FIG. 12 is a dataflow diagram illustrating an example process for registering an NF with a registry device (e.g., a global master registry device), and related data items, according to various examples.

FIG. 12 is a dataflow diagram illustrating an example process 1200 for processing a registration of an NF, and related data items. Process 1200 can be performed, e.g., by a first registry device such as a global master NRF 206 of a telecommunication system 100. The first registry device can include communications interface 316 and registration datastore 326, e.g., held in CRM 324 or other component of data-storage system 310. In some examples discussed below, registration datastore 326 holds registrations that are synchronized with other registry devices. The first registry device can additionally store registrations that are not synchronized with other registry devices, although this is not required.

The first registry device can include at least one processor 304 and at least one code memory 322, or another control unit. In some examples, the first registry device includes control unit(s) configured to perform operations of process 1200, e.g., in response to computer program instructions.

At 1202, the control unit can receive, via the communications interface 316, a registration message 1204 (which can represent registration message 404, 804). Registration message 1204 can specify a first network address 1206 (which can represent network address 406, 806) associated with a first NF, e.g., a global NF such as provider NF 202. Registration message 1204 can additionally specify a first NFType 1208 (which can represent NFType 408, 808) associated with the first NF. Examples are discussed herein, e.g., with reference to FIG. 2 #2 and operations 402, 802. Registration message 1204 can be received directly from the first NF, or from another registry device (see, e.g., FIG. 15).

At 1210, the control unit can add a registration 1212 (which can represent registration 412, 812) to the first registration datastore 326 in response to the registration message 1204. The registration 1212 can associate the first NFType 1208 with the first network address 1206. Examples are discussed herein, e.g., with reference to operations 410, 810.

At 1214, the control unit can send an indication 1216 of the registration 1212 to a second registry device. The second registry device can be, e.g., regional master NRF 208. Examples are discussed herein, e.g., with reference to FIG. 2 #3. For example, the control unit can send indication 1216 via communications interface 316. In some examples, the control unit pushes indication 1216 to the second registry device. In some examples, the control unit receives a pull request from the second registry device and responds with indication 1216.

Indication 1216 can include data of registration 1212, e.g., network address 1206 and NFType 1208 (or representations thereof). Indication 1216 can additionally or alternatively include metadata, e.g., a timestamp of the registration 1212, an expiration timestamp of the registration 1212, network-routing information, heartbeat information, or other information held in registration datastore 326 but not provided (at all, or by default) to a requester such as consumer NF 210.

In some examples, indication 1216 can include a SyncML sync package or data update status package (or portion of either of those); an rsync merge instruction; a synchronization instruction associated with a third-party sync service such as DROPBOX or ONEDRIVE; or another file- or data-synchronization packet. Additionally or alternatively, indication 1216 can include an Andrew File System (AFS), Network File System (NFS), Server Message Block (SMB), or Common Internet File System (CIFS) data packet (e.g., an SMB file-access packet), or other data packet determined according to a file-sharing protocol and containing data of a file holding registration 1212. Additionally or alternatively, indication 1216 can include a copy (e.g., via rcp or scp/ssh) of at least a portion of a file holding data of registration 1212. Additionally or alternatively, indication 1216 can include data of registration 1212 not wrapped in a synchronization or file-sharing packet, but instead sent via an HTTP PATCH or other custom sharing technique. Additionally or alternatively, indication 1216 can include a message defined in a native protocol of the registry device, e.g., an Nnrf_NF-Management_NFRegister message. Further examples of registration messages and data are described herein with reference to operation 402 and registration message 404.

Figure 13:
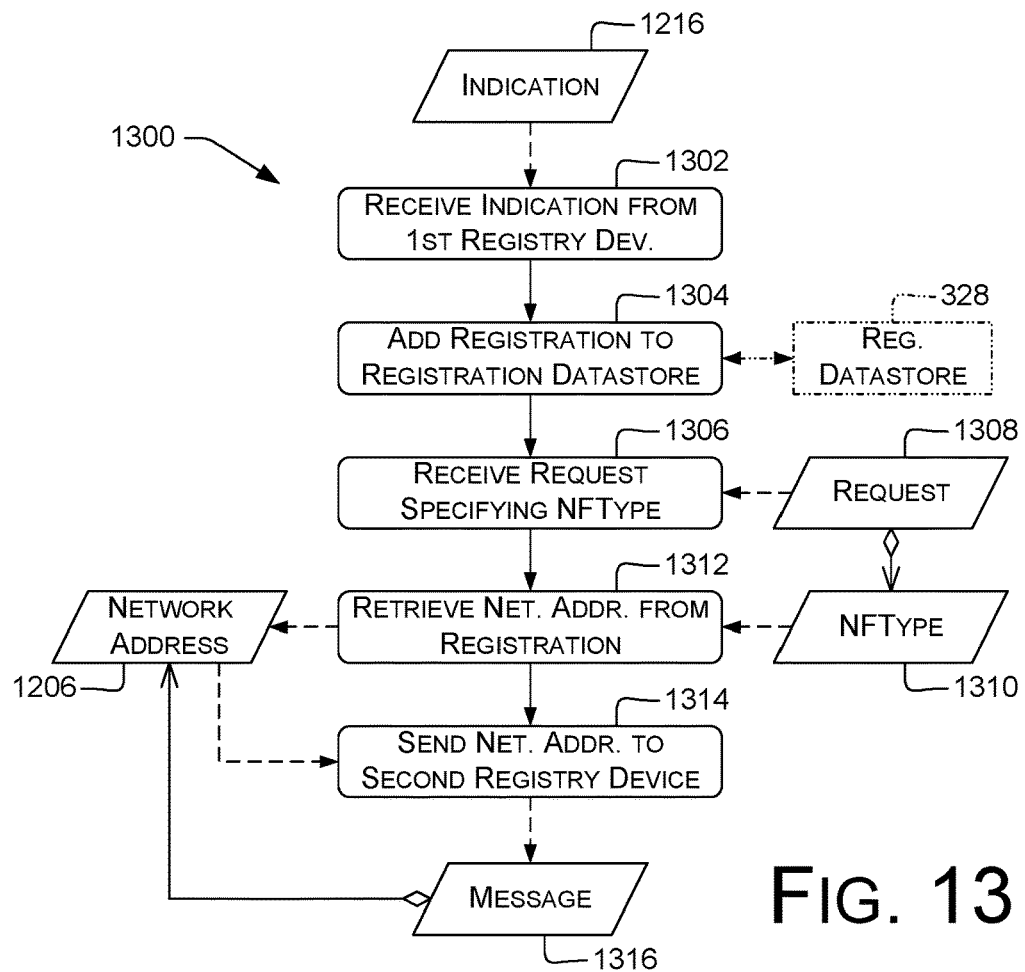
FIG. 13 is a dataflow diagram illustrating an example process for providing a network address of an NF (e.g., at a regional master registry device), and related data items, according to various examples.

FIG. 13 is a dataflow diagram illustrating an example process 1300 performed by a network registry device for providing a network address, and related data items. In some examples, a second registry device, e.g., a regional master NRF such as regional master NRF 208, includes control unit(s) configured to perform operations described below, e.g., in response to computer program instructions. The second registry device can include a communications interface 316 and a second registration datastore 328, e.g., held in CRM 324 or other component of data-storage system 310. In some examples, operation 1302 is performed after operation 1214.

At 1302, the control unit can receive the indication 1216 of the registration 1212 from the first registry device (e.g., global master NRF 206). For example, the control unit can receive the indication 1216 via communications interface 316 using any of the synchronization protocols or techniques described herein with reference to operation 1214. Examples are discussed herein, e.g., with reference to FIG. 2 #3.

At 1304, the control unit can add the registration 1212 to the registration datastore 328 (of the second registry device) in response to the indication 1216. Examples are discussed herein, e.g., with reference to operation 1210.

At 1306, the control unit can receive, via the communications interface 316, a first request 1308 (which can represent request 416, 816) for a network address associated with an NF. First request 1308 can specify an NFType 1310 (which can represent NFType 418, 818). Operation 1306 can be performed after operation 1304, in some examples. First request 1308 can be received from a third registry device, e.g., a regional NRF such as regional NRF 212. Examples are discussed herein, e.g., with reference to FIG. 2 #5 and operations 414, 814.

At 1312, the control unit can retrieve the first network address 1206 from the second registration datastore based at least in part on the NFType 1310 in the first request 1308. For example, operation 1312 can be performed in response to a determination that NFType 1310 matches first NFType 1208 indicated in registration 1212. Examples are discussed herein, e.g., with reference to operations 420, 820.

At 1314, the control unit can send, via the communications interface 316, the first network address 1206 to the third registry device. For example, the control unit can send a message 1316 (which can represent message 424, 824)

including the first network address 1206. Examples are discussed herein, e.g., with reference to FIG. 2 #6 and operations 422, 822.

In some examples, the third registry device (e.g., regional NRF 212) does not communicate with the first registry device (e.g., global master NRF 206). In some of these examples, the third registry device is configured to communicate with the second registry device (e.g., regional master NRF 208) and is not configured to communicate with the first registry device. For example, static configuration at the third registry device can provide the third registry device with a network name or address of the second registry device but not of the first registry device. This can reduce the number of network connections required, which can increase network robustness.

In some examples, a system includes a first registry device configured to perform process 1200 and a second registry device configured to perform process 1300. In some examples, the global master NRF 206 performs process 1200 and the regional master NRF 208 performs process 1300. In some examples, the global master NRF 206 performs process 1300 and the regional master NRF 208 performs process 1200. For example, synchronization can be bidirectional. In some examples, synchronization is unidirectional (e.g., global master NRF 206 to regional master NRF 208 but not the other way around, or vice versa). In some examples, a system further includes a third registry device configured to request addresses, e.g., as discussed herein with reference to FIG. 2 #5 and operations 510, 912.

Figure 14:
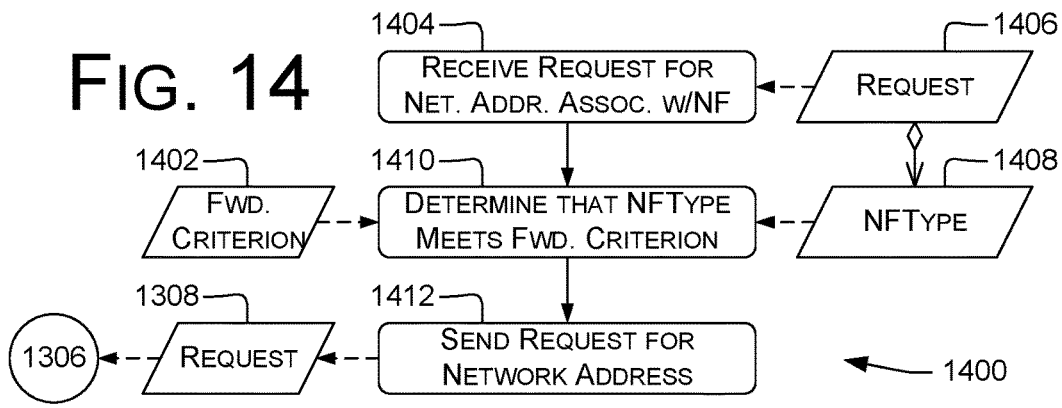
FIG. 14 is a dataflow diagram illustrating an example process for forwarding a network-address request (e.g., at a regional registry device), and related data items, according to various examples.

FIG. 14 is a dataflow diagram illustrating example processes 1400 performed by a network registry device for forwarding a network-address request, and related data items. In some examples, a registry device, e.g., regional NRF 212, includes control unit(s) configured to perform operations described below, e.g., processor(s) 304. In some examples, operation 1412 is performed before operation 1306.

In some examples, a system includes a first registry device configured to perform process 1200, a second registry device configured to perform process 1300, and a third registry device (e.g., regional NRF 212) configured to perform process 1400. The third registry device can include a communications interface 316 and a CRM 324 configured to hold a forwarding criterion 1402 (which can represent forwarding criterion 502).

At 1404, the control unit can receive, via the third communications interface, a second request 1406 for a network address associated with an NF. Second request 1406 can specify an NFType 1408 (which can represent or match NFType 1208). For example, second request 1406 can include a query from an NF in a region, e.g., consumer NF 210. Examples are discussed herein, e.g., with reference to operation 504.

At 1410, the control unit can determine that the first NFType 1408 meets the forwarding criterion 1402. Examples are discussed herein, e.g., with reference to operation 508 and FIG. 7. For example, the control unit can determine that NFType 1408 matches NFType 1208.

At 1412, the control unit can send, via the second communications interface, the first request 1308 for the network address associated with the NF to the second registry device. The first request 1308 can specify the first NFType 1408 (which can, accordingly, represent NFType 1310). Examples are discussed herein, e.g., with reference to operation 510. Operation 1412 can be performed in response to the determination at operation 1410.

Figure 15:
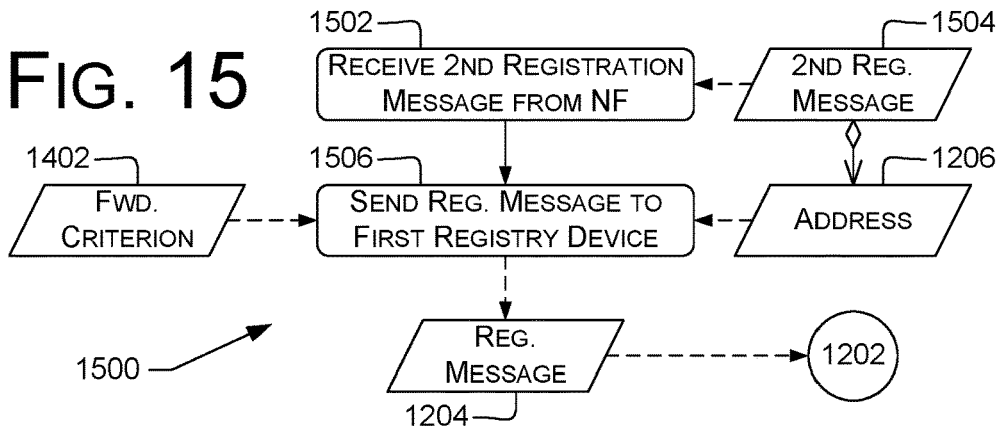
FIG. 15 is a dataflow diagram illustrating an example process for registering an NF with a registry device (e.g., at a global registry device), and related data items, according to various examples.

FIG. 15 is a dataflow diagram illustrating example processes 1500 performed by a network registry device for registering an NF, and related data items. In some examples, a registry device, e.g., a global NRF such as global NRF 204, includes control unit(s) configured to perform operations described below, e.g., processor(s) 304. In some examples, operations 1502 and 1506 are performed before operation 1202.

In some examples, a system includes a first registry device (e.g., global master NRF 206) configured to perform process 1200, a second registry device (e.g., regional master NRF 208) configured to perform process 1300, and a fourth registry device (e.g., global NRF 204) configured to perform process 1500. The fourth registry device can include a respective communications interface 316.

At 1502, the control unit can receive, via the communications interface 316, a second registration message 1504 from the first NF (e.g., provider NF 202). Second registration message 1504 can specify the first network address 1206 associated with the first NF. Examples are discussed herein, e.g., with reference to FIG. 2 #1. For example, the registration message can include an Nnrf_NFManagement_NFRegister or Nnrf_NFManagement_NFUpdate message.

At 1506, the control unit can send, in response, the registration message 1204 to the first registry device (e.g., global master NRF 206). The registration message 1204 can include the network address 1206. Examples are discussed herein, e.g., with reference to FIG. 2 #2 and operations 402, 802, 1202.

Figure 16:
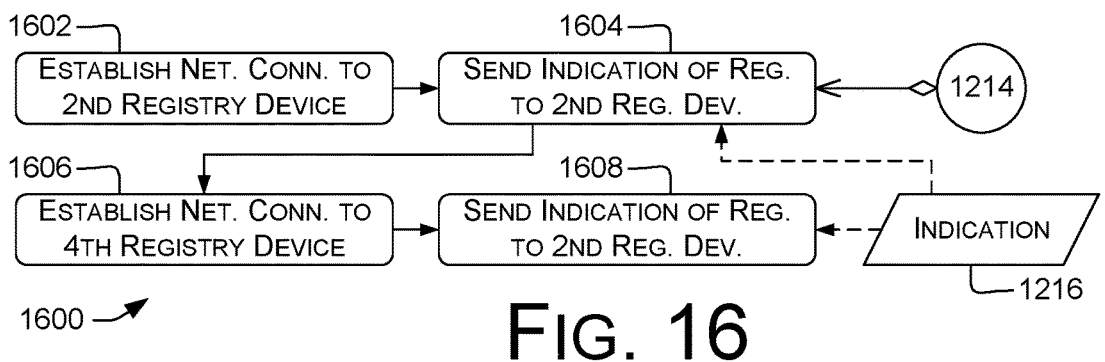
FIG. 16 is a dataflow diagram illustrating an example process for distributing registration data (e.g., from a global master registry device), and related data items, according to various examples.

FIG. 16 is a dataflow diagram illustrating example processes 1600 performed by a network registry device for distributing registration data, and related data items. In some examples, a registry device, e.g., global master NRF 206, includes control unit(s) configured to perform operations described below, e.g., processor(s) 304. In some examples, at least: operation 1214 includes operation 1604; operation 1214 includes or is mutually independent of operation 1608; or operation 1214 is mutually independent of operations 1602 and 1606. In some examples, operations 1602 and 1604 are mutually independent of operations 1606 and 1608. In some examples, a global master NRF pushes registration data to multiple regional master NRFs. The multiple regional master NRFs can correspond to geographical regions, service classes (e.g., roaming vs. non-roaming), or other divisions, in any combination.

At 1602, the control unit can establish a first network connection to the second registry device (e.g., regional master NRF 208). The network connection can include, e.g., a TCP or Signalling Connection Control Part (SCCP) connection. The control unit can establish the connection using any of the protocols described herein with reference to operation 1214, e.g., on any of the well-known ports of any of those protocols.

At 1604, the control unit can send the indication 1216 of the registration 1212 to the second registry device via the first network connection. Examples are discussed herein, e.g., with reference to operation 1214.

At 1606, the control unit can establish a second network connection to a fourth registry device. For example, the fourth registry device can be a second regional master NRF, for the same region or for a different region. Examples are discussed herein, e.g., with reference to operation 1602.

At 1608, the control unit can send the indication 1216 of the registration 1212 to the fourth registry device via the second network connection. Examples are discussed herein, e.g., with reference to operation 1604.

Figure 17:
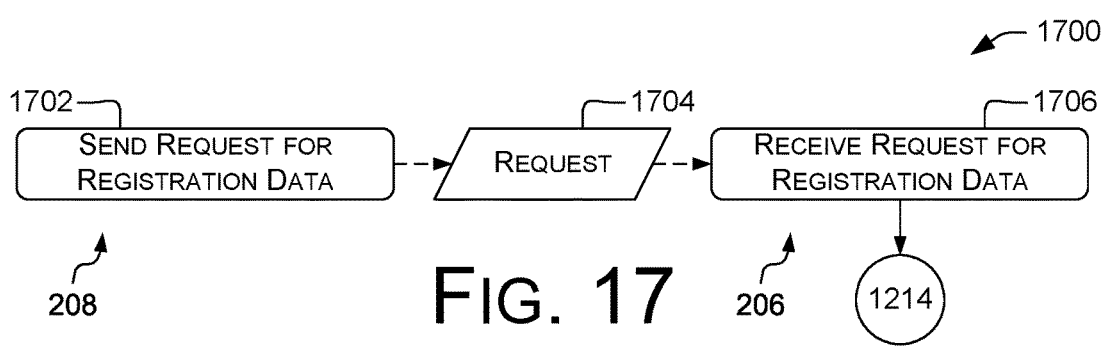
FIG. 17 is a dataflow diagram illustrating an example process for synchronizing registration data (e.g., between a global master registry device and a regional master registry device), and related data items, according to various examples.

FIG. 17 is a dataflow diagram illustrating an example process 1700 performed by a network registry device for synchronizing registration data using a pull modality, and related data items. In some examples, a second registry device, e.g., regional master NRF 208, includes control unit(s) configured to perform operation 1702 described below, e.g., processor(s) 304. In some examples, a first registry device, e.g., global master NRF 206, includes control unit(s) configured to perform operation 1706 described below, e.g., processor(s) 304. In some examples, operation 1210 is performed before operation 1706. In some examples, operation 1706 is performed before operation 1214. Some examples include a registry device configured to perform operation 1702 but not operation 1706. Some examples include a registry device configured to perform operation 1706 but not operation 1702.

At 1702, the control unit of the second registry device can send a request 1704 for registration data. Request 1704 can include a connection request, file-copy request, or other network transmission requesting the registration data. Request 1704 can be formatted, e.g., according to any of the protocols described herein with reference to operation 1214. In some examples, the request can be an Nnrf_NFDiscovery_NFDiscover message or other message requesting registration or address information, e.g., in a native protocol of the registry devices.

In some examples, registry devices such as regional NRFs 108, 212 subscribe to updates regarding NFs, e.g., NFs for which those registry devices have received queries, or NFs known to those registry devices. In some of these examples, request 1704 can include a subscription request, e.g., an Nnrf_NFManagement_NFStatusSubscribe request.

At 1706, the control unit of the first registry device can receive the request 1704 for the registration data. Operation 1706 can be followed by operation 1214 of sending the indication 1216 of the registration 1212 to the second registry device. Operation 1214 can be performed in response to the receipt at operation 1706.

In some examples in which request 1704 is a subscription request, operation 1214 can be performed after operation 1706, e.g., in response to a message from an NF changing the registration status of (e.g., registering or de-registering) that NF. For example, when a provider NF 104, 202 updates the first registry device with new status, the first registry device (e.g., global NRF 102 or global master NRF 206) can send notifications (e.g., Nnrf_NFManagement_NFStatusNotify messages) to other registry devices (e.g., regional NRF 108 or regional master NRF 208).

Some examples of synchronization techniques described herein with reference to FIGS. 12, 13, and 17 (e.g., operation 1214) can additionally or alternatively be used to transmit information about de-registrations. For example, Nnrf_NFManagement_NFStatusNotify messages can be transmitted by registry devices in response to failure to receive heartbeat messages and concomitant suspension or removal of a registration, or in response to heartbeat messages again being received after an outage, and a registration being re-activated.

Figure 18:
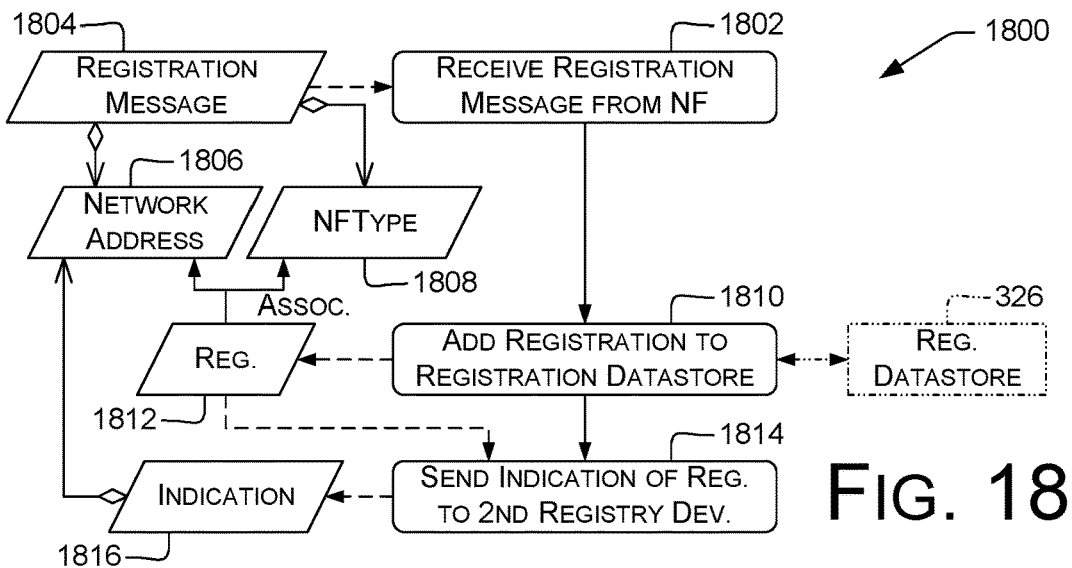
FIG. 18 is a dataflow diagram illustrating an example process for registering an NF (e.g., at a global master registry device), and related data items, according to various examples.

FIG. 18 is a dataflow diagram illustrating an example process 1800 for registering an NF, and related data items. Process 1800 can be performed, e.g., by a first registry device such as a global master NRF 206 of a telecommunication system 100. The first registry device can include communications interface 316 and registration datastore 326, e.g., held in CRM 324 or other component of data-storage system 310. In some examples discussed below, registration datastore 326 holds registrations that are synchronized with other registry devices. The first registry device can additionally store registrations that are not synchronized with other registry devices, although this is not required.

The first registry device can include at least one processor 304 and at least one code memory 322, or another control unit. In some examples, the first registry device includes control unit(s) configured to perform operations of process 1800, e.g., in response to computer program instructions.

At 1802, the control unit can receive, via communications interface 316, a registration message 1804 (which can represent registration message 404, 804, 1204). Registration message 1804 can specify a first network address 1806 (which can represent network address 406, 806, 1206) associated with a first NF, e.g., a global NF, and a first NFType 1808 (which can represent NFType 408, 808, 1208) associated with the first NF. Examples are discussed herein, e.g., with reference to FIG. 2 #2 and operations 402, 802, 1202.

At 1810, the control unit can add a registration 1812 (which can represent registration 412, 812, 1212) to the first registration datastore 326 in response to the registration message 1804. Registration 1812 can associate the first NFType 1808 with the first network address 1806. Examples are discussed herein, e.g., with reference to operations 410, 810, 1210.

At 1814, the control unit can send (e.g., via push or pull) an indication 1816 (which can represent indication 1216) of registration 1812 to the second registry device (e.g., regional master NRF 208). Examples are discussed herein, e.g., with reference to FIG. 2 #3 and operation 1214.

Figure 19:
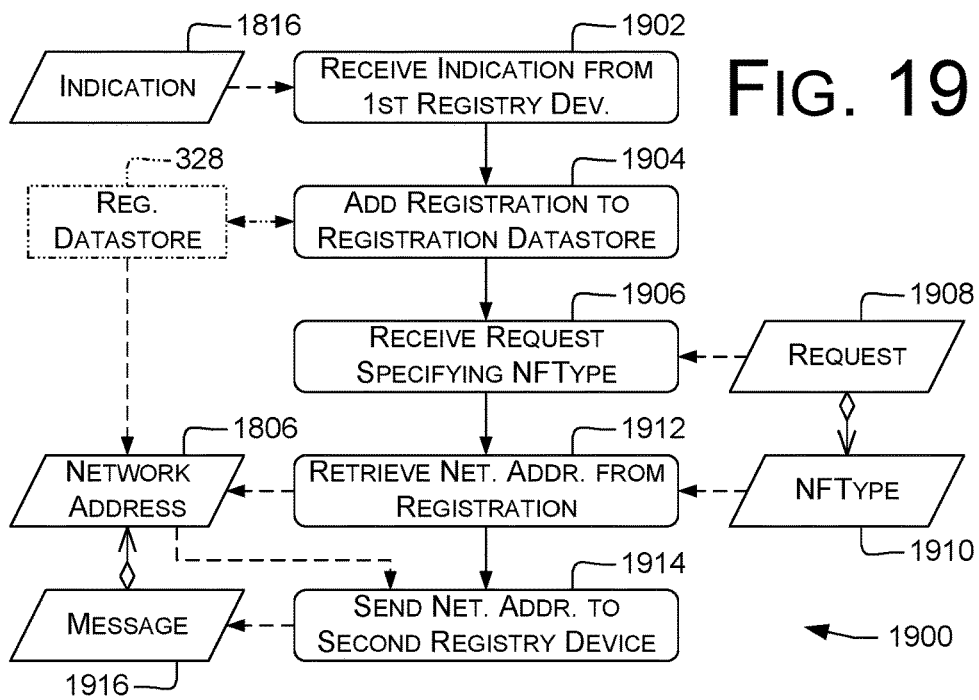
FIG. 19 is a dataflow diagram illustrating an example process for providing a network address of an NF (e.g., at a regional master registry device), and related data items, according to various examples.

FIG. 19 is a dataflow diagram illustrating an example process 1900 performed by a network registry device for providing a network address, and related data items. In some examples, a second registry device, e.g., a regional master NRF such as regional master NRF 208, includes control unit(s) configured to perform operations described below, e.g., in response to computer program instructions. The second registry device can include a communications interface 316 and a second registration datastore 328, e.g., held in CRM 324 or other component of data-storage system 310. In some examples, operation 1814 can be performed before operation 1902.

At 1902, the control unit can receive the indication 1816 of the registration 1812 from the first registry device, e.g., global master NRF 206. Examples are discussed herein, e.g., with reference to FIG. 2 #3 and operation 1302.

At 1904, the control unit can add the registration 1812 to the second registration datastore 328 in response to the indication 1816. Examples are discussed herein, e.g., with reference to operation 1304.

At 1906, the control unit can receive, via the communications interface 316 from the third registry device, a first request 1908 for a network address associated with an NF. First request 1908 can specify an NFType 1910, e.g., matching first NFType 1808. For example, first request 1908 can include a query from regional NRF 212. Operation 1906 can be performed after operation 1904, in some examples. Examples are discussed herein, e.g., with reference to FIG. 2 #5 and operation 1306.

At 1912, the control unit can retrieve the first network address 1806 from the second registration datastore 328 based at least in part on the NFType 1910 in the first request 1908, e.g., in response to NFType 1910 matching first NFType 1808. Examples are discussed herein, e.g., with reference to operation 1312.

At 1914, the control unit can send, via the communications interface 316, the first network address 1806 to the third registry device. For example, the control unit can send a message 1916 including the network address 1806. Examples are discussed herein, e.g., with reference to FIG. 2 #6 and operation 1314.

Figure 20:
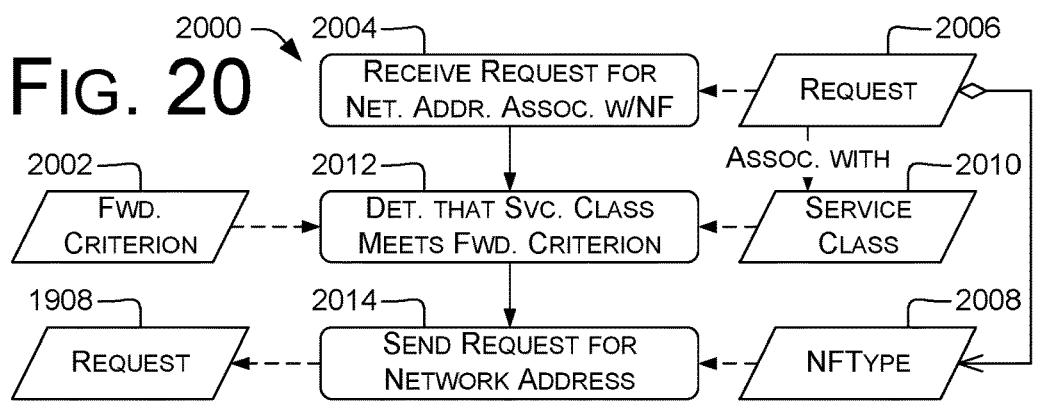
FIG. 20 is a dataflow diagram illustrating an example process for forwarding a network-address request, and related data items, according to various examples.

FIG. 20 is a dataflow diagram illustrating an example process 2000 performed by a network registry device for forwarding a network-address request, and related data items. In some examples, a third registry device, e.g., a regional NRF such as regional NRF 212, includes control unit(s) configured to perform operations described below, e.g., in response to computer program instructions. The third registry device can include a communications interface 316 and a CRM 324 (or other component of data-storage system 310) storing a forwarding criterion 2002 (which can represent forwarding criterion 502, 902). In some examples, operation 2014 can be performed before operation 1906.

At 2004, the control unit can receive, via the communications interface 316, a second request 2006 (which can represent request 506, 906, 1308, 1406) for a network address associated with an NF. For example, second request 2006 can be a query from a regional NF. Second request 2006 can specify an NFType 2008 (which can represent NFType 418, 818, 1008, 1310, 1408) and be associated with a first service class 2010 (which can represent service class 908). For example, first service class 2010 can specify that second request 2006 is associated with MVNO, IoT, roaming, or non-roaming use.

At 2012, the control unit can determine that the first service class 2010 meets the forwarding criterion 2002. Examples are discussed herein, e.g., with reference to operation 910.

At 2014, the control unit can send, via the communications interface 316, the first request 1908 for the network address associated with the NF to the second registry device. First request 1908 can specify the first NFType 2008, which can match NFType 1808 in some examples. Operation 2014 can be performed in response to the determination at operation 2012. Examples are discussed herein, e.g., with reference to operation 912.

In some examples, a system includes a first registry device configured to perform process 1800, a second registry device configured to perform process 1900, and a third registry device configured to perform process 2000. In some examples, the global master NRF 206 performs process 1800, the regional master NRF 208 performs process 1900, and the regional NRF 212 performs process 2000. In other examples, other NRFs or registry devices perform these processes. In some examples, synchronization is unidirectional (e.g., global master NRF 206 to regional master NRF 208 but not the other way around, or vice versa); in other examples, synchronization is bidirectional.

In some examples, the third registry device (e.g., regional NRF 212) does not communicate with the first registry device (e.g., global master NRF 206). In some of these examples, the third registry device is configured to communicate with the second registry device (e.g., regional master NRF 208) and is not configured to communicate with the first registry device. For example, static configuration at the third registry device can provide the third registry device with a network name or address of the second registry device but not of the first registry device. This can reduce the number of network connections required, which can increase network robustness.

Figure 21:
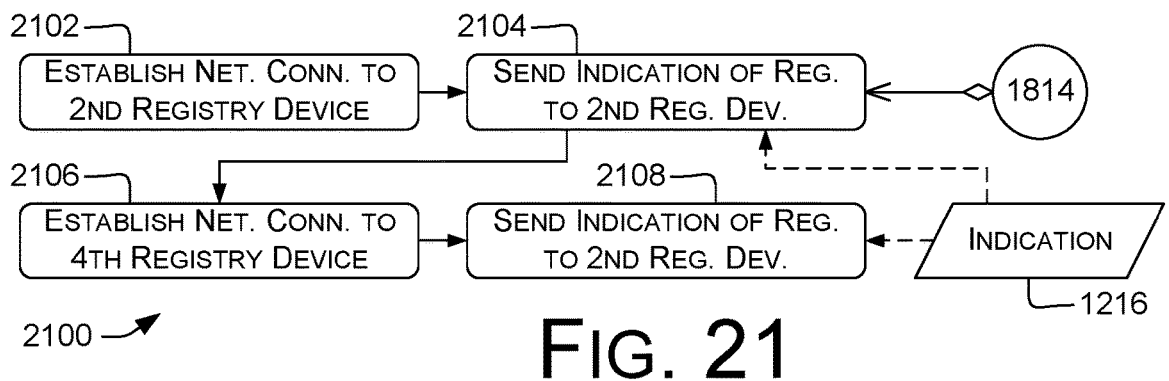
FIG. 21 is a dataflow diagram illustrating an example process for distributing registration data (e.g., from a global master registry device), and related data items, according to various examples.

FIG. 21 is a dataflow diagram illustrating an example process 2100 performed by a network registry device for distributing registration data, and related data items. In some examples, a registry device, e.g., global master NRF 206, includes control unit(s) configured to perform operations described below, e.g., processor(s) 304. In some examples, at least: operation 1814 includes operation 2104; operation 1814 includes or is mutually independent of operation 2108; or operation 1814 is mutually independent of operations 2102 and 2106. In some examples, operations 2102 and 2104 are mutually independent of operations 2106 and 2108. In some examples, a global master NRF pushes registration data to multiple regional master NRFs, e.g., as discussed herein with reference to FIG. 16.

At 2102, the control unit can establish a first network connection to the second registry device. Examples are discussed herein, e.g., with reference to operation 1602.

At 2104, the control unit can send the indication 1816 of the registration 1812 to the second registry device via the first network connection. Examples are discussed herein, e.g., with reference to operation 1604.

At 2106, the control unit can establish a second network connection to a fourth registry device, e.g., a second regional master NRF. Examples are discussed herein, e.g., with reference to operation 1606.

At 2108, the control unit can send the indication 1816 of the registration 1812 to the fourth registry device via the second network connection. Examples are discussed herein, e.g., with reference to operation 1608.

Figure 22:
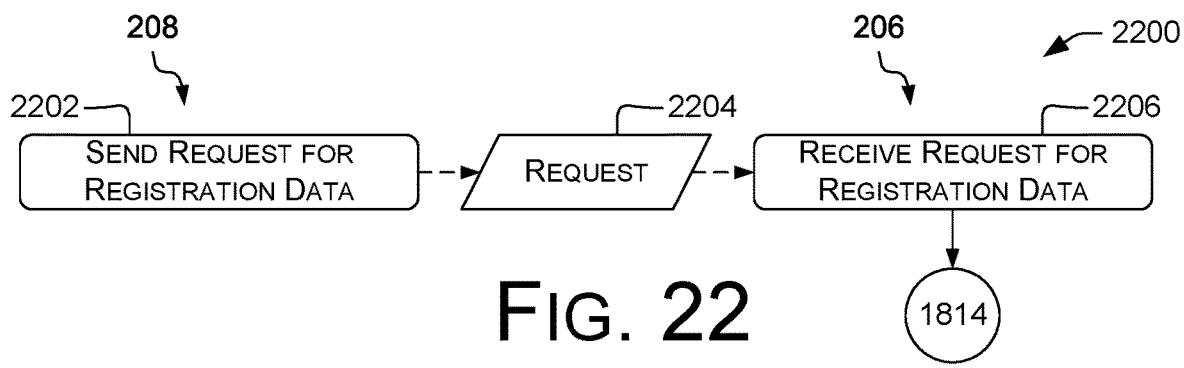
FIG. 22 is a dataflow diagram illustrating an example process for synchronizing registration data (e.g., between a global master registry device and a regional master registry device), and related data items, according to various examples.

FIG. 22 is a dataflow diagram illustrating an example process 2200 performed by a network registry device for pulling registration data, and related data items. In some examples, a second registry device, e.g., regional master NRF 208, includes control unit(s) configured to perform operation 2202 described below, e.g., processor(s) 304. In some examples, a first registry device, e.g., global master NRF 206, includes control unit(s) configured to perform operation 2206 described below, e.g., processor(s) 304. In some examples, operation 1810 precedes operation 2206. In some examples, operation 2206 precedes operation 1814. Some examples include a registry device configured to perform operation 2202 but not operation 2206. Some examples include a registry device configured to perform operation 2206 but not operation 2202.

At 2202, the control unit of the second registry device can send a request 2204 (which can represent request 1704) for registration data. Examples are discussed herein, e.g., with reference to operation 1702.

At 2206, the control unit of the first registry device can receive the request 2204 for the registration data. Examples are discussed herein, e.g., with reference to operation 1706. The control unit of the first registry device can, in response, perform operation 1814 of sending the indication 1816 of the registration 1812 to the second registry device.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A system, wherein: the system comprises: a first registry device (e.g., a global NRF) comprising: a first communications interface; a first computer-readable medium configured to hold a first registration datastore; and a first control unit configured to perform first operations; and a second registry device (e.g., a regional NRF) comprising: a second communications interface; a first computer-readable medium configured to hold (e.g., as code or data) a forwarding criterion; and a second control unit configured to perform second operations; the first operations comprise: receiving, via the first communications interface, a registration message from a first (e.g., a global) network function (NF), the registration message specifying a first network address associated with the first NF and a first network function type (NFType) associated with the first NF; and adding a registration to the first registration datastore in response to the registration message, the registration associating the first NFType with the first network address; the second operations comprise: (e.g., a query from a regional NRF) receiving, via the second communications interface, a first request for a network address associated with an NF, the first request specifying the first NFType; determining that the first NFType meets the forwarding criterion; and in response, sending, via the second communications interface, a second request for the network address associated with the NF to the first registry device, the second request specifying the first NFType; the first operations comprise: receiving, via the first communications interface, the second request; retrieving the first network address from the registration based at least in part on the first NFType in the second request; and sending, via the first communications interface, the first network address to the second registry device; and the second operations comprise: receiving, via the second communications interface, the first network address; and sending, via the second communications interface, a reply to the first request, the reply comprising the first network address.

B: The system according to paragraph A, the first operations comprising: (e.g., a query from a global NRF) receiving, via the second communications interface from the first NF, a third request for a second network address associated with a second NF, the third request specifying a second NFType; retrieving the second network address from the registration datastore based at least in part on the second NFType; and sending, via the first communications interface to the first NF, the second network address to the first NF.

C: The system according to paragraph A or B, wherein: the forwarding criterion specifies (e.g., a in code or data) a predetermined set of NFTypes; and the second operations comprise determining that the first NFType meets the forwarding criterion at least partly by determining that the first NFType is included in the set of NFTypes.

D: The system according to any of paragraphs A-C, wherein: the forwarding criterion comprises (e.g., a data of) a set of NFTypes; and the second operations comprise: receiving, via the second communications interface, a second registration message from a second NF, the registration message specifying a second NFType associated with the second NF; adding the second NFType to the set of NFTypes; and subsequently, determining that the first NFType meets the forwarding criterion at least partly by determining that the first NFType is not included in the set of NFTypes.

E: A system, wherein: the system comprises: a first registry device comprising: a first communications interface; a first computer-readable medium configured to hold a first registration datastore; and a first control unit configured to perform first operations; and a second registry device comprising: a second communications interface; a second computer-readable medium configured to hold a forwarding criterion; and a second control unit configured to perform second operations; the first operations comprise: receiving, via the first communications interface, a registration message from a first network function (NF), the registration message specifying a first network address associated with the first NF and a first network function type (NFType) associated with the first NF; and adding a registration to the first registration datastore in response to the registration message, the registration associating the first NFType with the first network address; the second operations comprise: receiving, via the second communications interface, a first request for a network address associated with an NF, the first request specifying the first NFType; determining that the first NFType meets the forwarding criterion; and in response, sending, via the second communications interface, a second request for the network address associated with the NF to the first registry device, the second request specifying the first NFType; the first operations comprise: receiving, via the first communications interface, the second request; retrieving the first network address from the registration based at least in part on the first NFType in the second request; and sending, via the first communications interface, the first network address to the second registry device; and the second operations comprise: receiving, via the second communications interface, the first network address; and sending, via the second communications interface, a reply to the first request, the reply comprising the first network address.

F: The system according to paragraph E, the first operations comprising: receiving, via the first communications interface from the first NF, a third request for a second network address associated with a second NF, the third request specifying a second NFType; retrieving the second network address from the registration datastore based at least in part on the second NFType; and sending, via the first communications interface, the second network address to the first NF.

G: The system according to paragraph E or F, wherein: the forwarding criterion specifies a predetermined set of NFTypes; and the second operations comprise determining that the first NFType meets the forwarding criterion at least partly by determining that the first NFType is included in the set of NFTypes.

H: The system according to any of paragraphs E-G, wherein: the forwarding criterion comprises a set of NFTypes; and the second operations comprise: receiving, via the second communications interface, a second registration message from a second NF, the registration message specifying a second NFType associated with the second NF; adding the second NFType to the set of NFTypes; and subsequently, determining that the first NFType meets the forwarding criterion at least partly by determining that the first NFType is not included in the set of NFTypes.

I: The system according to any of paragraphs E-H, wherein: the first registry device comprises a first Network Resource Function (NRF); the second registry device comprises a second NRF; and the first NF comprises at least one of: a CHF, a UDM, an SMF, or a UPF.

J: A system, wherein: the system comprises: a first registry device comprising: a first communications interface; a first computer-readable medium configured to hold a first registration datastore; and a first control unit configured to perform first operations; and a second registry device comprising: a second communications interface; a second computer-readable medium configured to hold a forwarding criterion; and a second control unit configured to perform second operations; the first operations comprise: receiving, via the first communications interface, a registration message from a first network function (NF), the registration message specifying a first network address associated with the first NF and a first network function type (NFType) associated with the first NF; and adding a registration to the first registration datastore in response to the registration message, the registration associating the first NFType with the first network address; the second operations comprise: receiving, via the second communications interface, a first request for a network address associated with an NF, the first request specifying the first NFType and associated with a first service class; determining that the first service class meets the forwarding criterion; and in response, sending, via the second communications interface, a second request for the network address associated with the NF to the first registry device, the second request specifying the first NFType; the first operations comprise: receiving, via the first communications interface, the second request; retrieving the first network address from the registration based at least in part on the first NFType in the second request; and sending, via the first communications interface, the first network address to the second registry device; and the second operations comprise: receiving, via the second communications interface, the first network address; and sending, via the second communications interface, a reply to the first request, the reply comprising the first network address.

K: The system according to paragraph J, the first operations comprising: receiving, via the second communications interface from the first NF, a third request for a second network address associated with a second NF, the third request specifying a second NFType; retrieving the second network address from the registration datastore based at least in part on the second NFType; and sending, via the first communications interface to the first NF, the second network address to the first NF.

L: The system according to paragraph J or K, wherein: the forwarding criterion specifies a predetermined set of service classes; and the second operations comprise determining that the first service class meets the forwarding criterion at least partly by determining that the first service class is included in the set of service classes.

M: The system according to any of paragraphs J-L, wherein: the forwarding criterion comprises a set of NFTypes; and the second operations comprise: receiving, via the second communications interface, a second registration message from a second NF, the registration message specifying a second NFType associated with the second NF; adding the second NFType to the set of NFTypes; subsequently, determining that the first NFType meets the forwarding criterion at least partly by determining that the first NFType is not included in the set of NFTypes; and sending the second request further in response to the determination that the first NFType meets the forwarding criterion.

N: The system according to any of paragraphs J-M, wherein: the first registry device comprises a first Network Resource Function (NRF); the second registry device comprises a second NRF; and the first service class comprises at least one of: an MVNO service class, an IoT service class, a roaming service class, or a PAPN service class.

O: A system, wherein: the system comprises: a first registry device comprising: a first communications interface; a first computer-readable medium configured to hold a first registration datastore; and a first control unit configured to perform first operations; and a second registry device comprising: a second communications interface; a second computer-readable medium configured to hold a second registration datastore; and a second control unit configured to perform second operations; the first operations comprise: receiving, via the first communications interface, a registration message, the registration message specifying a first network address associated with a first network function (NF) and a first network function type (NFType) associated with the first NF; and adding a registration to the first registration datastore in response to the registration message, the registration associating the first NFType with the first network address; and sending an indication of the registration to the second registry device; and the second operations comprise: receiving the indication of the registration from the first registry device; adding the registration to the second registration datastore in response to the indication; subsequently, receiving, via the second communications interface from a third registry device, a first request for a network address associated with an NF, the first request specifying the first NFType; retrieving the first network address from the second registration datastore based at least in part on the first NFType in the first request; and sending, via the second communications interface, the first network address to the third registry device.

P: The system according to paragraph O, further comprising the third registry device, wherein the third registry device: is configured to communicate with the second registry device; and is not configured to communicate with the first registry device.

Q: The system according to paragraph O or P, wherein: the system further comprises the third registry device; the third registry device comprises: a third communications interface; a third computer-readable medium configured to hold a forwarding criterion; and a third control unit configured to perform third operations; and the third operations comprise: receiving, via the third communications interface, a second request for a network address associated with an NF, the second request specifying the first NFType; determining that the first NFType meets the forwarding criterion; and in response, sending, via the second communications interface, the first request for the network address associated with the NF to the second registry device.

R: The system according to any of paragraphs O-Q, wherein: the system further comprises a fourth registry device; the fourth registry device comprises: a fourth communications interface; and a fourth control unit configured to perform fourth operations; and the fourth operations comprise: receiving, via the fourth communications interface, a second registration message from the first NF, the second registration message specifying the first network address associated with the first NF; and sending, in response, the registration message to the first registry device.

S: The system according to any of paragraphs O-R, wherein: the second operations comprise sending a request for registration data; and the first operations comprise: receiving the request for the registration data; and sending, in response, the indication of the registration to the second registry device.

T: The system according to any of paragraphs O-S, wherein the first operations comprise: establishing a first network connection to the second registry device; sending the indication of the registration to the second registry device via the first network connection; establishing a second network connection to a fourth registry device; and sending the indication of the registration to the fourth registry device via the second network connection.

U: A system, wherein: the system comprises: a first registry device comprising: a first communications interface; a first computer-readable medium configured to hold a first registration datastore; and a first control unit configured to perform first operations; a second registry device comprising: a second communications interface; a second computer-readable medium configured to hold a second registration datastore; and a second control unit configured to perform second operations; and a third registry device comprising: a third communications interface; a third computer-readable medium configured to hold a forwarding criterion; and a third control unit configured to perform third operations; the first operations comprise: receiving, via the first communications interface, a registration message, the registration message specifying a first network address associated with a first network function (NF) and a first network function type (NFType) associated with the first NF; and adding a registration to the first registration datastore in response to the registration message, the registration associating the first NFType with the first network address; and sending an indication of the registration to the second registry device; and the second operations comprise: receiving the indication of the registration from the first registry device; adding the registration to the second registration datastore in response to the indication; subsequently, receiving, via the second communications interface from the third registry device, a first request for a network address associated with an NF, the first request specifying the first NFType; retrieving the first network address from the second registration datastore based at least in part on the first NFType in the first request; and sending, via the second communications interface, the first network address to the third registry device; and the third operations comprise: receiving, via the third communications interface, a second request for a network address associated with an NF, the second request specifying the first NFType and associated with a first service class; determining that the first service class meets the forwarding criterion; and in response, sending, via the third communications interface, the first request for the network address associated with the NF to the second registry device.

V: The system according to paragraph U, wherein the third registry device: is configured to communicate with the second registry device; and is not configured to communicate with the first registry device.

W: The system according to paragraph U or V, wherein: the second operations comprise sending a request for registration data; and the first operations comprise: receiving the request for the registration data; and sending, in response, the indication of the registration to the second registry device.

X: The system according to any of paragraphs U-W, wherein the first operations comprise: establishing a first network connection to the second registry device; sending the indication of the registration to the second registry device via the first network connection; establishing a second network connection to a fourth registry device; and sending the indication of the registration to the fourth registry device via the second network connection.

Y: Any of the above, wherein at least one of, or all of, the registry devices is not a DNS server.

Z: At least one factor from each of at least two of: paragraphs A-D, paragraphs E-I, paragraphs J-N, paragraphs O-T, paragraphs U-X, paragraph Y, or paragraph Z.

AA: A computer-readable medium, e.g., a computer storage medium, having thereon computer-executable instructions, the computer-executable instructions upon execution configuring a computer to perform operations as any of paragraphs A-D, E-I, J-N, O-T, U-X, Y, or Z recites.

AB: A device comprising: a processor; and a computer-readable medium, e.g., a computer storage medium, having thereon computer-executable instructions, the computer-executable instructions upon execution by the processor configuring the device to perform operations as any of paragraphs A-D, E-I, J-N, O-T, U-X, Y, or Z recites.

AC: A system comprising: means for processing; and means for storing having thereon computer-executable instructions, the computer-executable instructions including means to configure the system to carry out a method as any of paragraphs A-D, E-I, J-N, O-T, U-X, Y, or Z recites.

AD: A method comprising performing operations as any of paragraphs A-D, E-I, J-N, O-T, U-X, Y, or Z recites.

CONCLUSION

This disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. For example, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing systems 302, 320 or processors 304, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A system, wherein:
the system comprises:
  a first registry device comprising:
    a first communications interface;
    a first computer-readable medium configured to hold a first registration datastore; and
    a first control unit configured to perform first operations; and
  a second registry device comprising:
    a second communications interface;
    a second computer-readable medium configured to hold a forwarding criterion, the forwarding criterion comprising a set of NFTypes; and
    a second control unit configured to perform second operations;
the first operations comprise:
  receiving, via the first communications interface, a registration message from a first network function (NF), the registration message specifying a first network address associated with the first NF and a first network function type (NFType) associated with the first NF; and
  adding a registration to the first registration datastore in response to the registration message, the registration associating the first NFType with the first network address;
the second operations comprise:
  receiving, via the second communications interface, a first request for a network address associated with an NF, the first request specifying the first NFType;
  determining that the first NFType meets the forwarding criterion; and
  in response, sending, via the second communications interface, a second request for the network address associated with the NF to the first registry device, the second request specifying the first NFType;
the first operations comprise:
  receiving, via the first communications interface, the second request;
  retrieving the first network address from the registration based at least in part on the first NFType in the second request; and
  sending, via the first communications interface, the first network address to the second registry device; and
the second operations comprise:
  receiving, via the second communications interface, the first network address;
  sending, via the second communications interface, a reply to the first request, the reply comprising the first network address;
  receiving, via the second communications interface, a second registration message from a second NF, the registration message specifying a second NFType associated with the second NF;
  adding the second NFType to the set of NFTypes; and
  subsequently, determining that the first NFType meets the forwarding criterion at least partly by determining that the first NFType is not included in the set of NFTypes.

2. The system according to claim 1, the first operations comprising:
  receiving, via the first communications interface from the first NF, a third request for a second network address associated with a second NF, the third request specifying a second NFType;

retrieving the second network address from the first registration datastore based at least in part on the second NFType; and sending, via the first communications interface, the second network address to the first NF.

3. The system according to claim 1, wherein:
the forwarding criterion specifies a predetermined set of NFTypes; and
the second operations comprise determining that the first NFType meets the forwarding criterion at least partly by determining that the first NFType is included in the predetermined set of NFTypes.

4. The system according to claim 1, wherein:
the first registry device comprises a first Network Resource Function (NRF);
the second registry device comprises a second NRF; and
the first NF comprises at least one of: a charging function (CHF), a unified data management (UDM) NF, a session management function (SMF), or a user plane function (UPF).

5. A system, wherein:
the system comprises:
a first registry device comprising:
a first communications interface;
a first computer-readable medium configured to hold a first registration datastore; and
a first control unit configured to perform first operations; and
a second registry device comprising:
a second communications interface;
a second computer-readable medium configured to hold a forwarding criterion, the forwarding criterion comprising a set of NFTypes; and
a second control unit configured to perform second operations;
the first operations comprise:
receiving, via the first communications interface, a registration message from a first network function (NF), the registration message specifying a first network address associated with the first NF and a first network function type (NFType) associated with the first NF; and
adding a registration to the first registration datastore in response to the registration message, the registration associating the first NFType with the first network address;
the second operations comprise:
receiving, via the second communications interface, a first request for a network address associated with an NF, the first request specifying the first NFType and associated with a first service class;
determining that the first service class meets the forwarding criterion; and
in response, sending, via the second communications interface, a second request for the network address associated with the NF to the first registry device, the second request specifying the first NFType;
the first operations comprise:
receiving, via the first communications interface, the second request;
retrieving the first network address from the registration based at least in part on the first NFType in the second request; and
sending, via the first communications interface, the first network address to the second registry device; and the second operations comprise:
receiving, via the second communications interface, the first network address;
sending, via the second communications interface, a reply to the first request, the reply comprising the first network address,
receiving, via the second communications interface, a second registration message from a second NF, the registration message specifying a second NFType associated with the second NF;
adding the second NFType to the set of NFTypes;
subsequently, determining that the first NFType meets the forwarding criterion at least partly by determining that the first NFType is not included in the set of NFTypes; and
sending the second request further in response to the determination that the first NFType meets the forwarding criterion.

6. The system according to claim 5, the first operations comprising:
receiving, via the second communications interface from the first NF, a third request for a second network address associated with a second NF, the third request specifying a second NFType;
retrieving the second network address from the first registration datastore based at least in part on the second NFType; and
sending, via the first communications interface to the first NF, the second network address to the first NF.

7. The system according to claim 5, wherein:
the forwarding criterion specifies a predetermined set of service classes; and
the second operations comprise determining that the first service class meets the forwarding criterion at least partly by determining that the first service class is included in the predetermined set of service classes.

8. The system according to claim 5, wherein:
the first registry device comprises a first Network Resource Function (NRF);
the second registry device comprises a second NRF; and
the first service class comprises at least one of: a mobile virtual network operator (MVNO) service class, an Internet-of-Things (IoT) service class, a roaming service class, or a private access point name (PAPN) service class.

9. A system, wherein:
the system comprises:
a first registry device comprising:
a first communications interface;
a first computer-readable medium configured to hold a first registration datastore; and
a first control unit configured to perform first operations; and
a second registry device comprising:
a second communications interface;
a second computer-readable medium configured to hold a second registration datastore; and
a second control unit configured to perform second operations;
the first operations comprise:
receiving, via the first communications interface, a registration message, the registration message specifying a first network address associated with a first network function (NF) and a first network function type (NFType) associated with the first NF; and adding a registration to the first registration datastore in response to the registration message, the registration associating the first NFType with the first network address; and sending an indication of the registration to the second registry device; and the second operations comprise:

receiving the indication of the registration from the first registry device;

adding the registration to the second registration datastore in response to the indication;

subsequently, receiving, via the second communications interface from a third registry device, a first request for a network address associated with an NF, the first request specifying the first NFType;

retrieving the first network address from the second registration datastore based at least in part on the first NFType in the first request; and sending, via the second communications interface, the first network address to the third registry device, wherein the third registry device is configured to communicate with the second registry device and is not configured to communicate with the first registry device.

10. The system according to claim 9, wherein:

the system further comprises the third registry device;

the third registry device comprises:

a third communications interface;

a third computer-readable medium configured to hold a forwarding criterion; and a third control unit configured to perform third operations; and the third operations comprise:

receiving, via the third communications interface, a second request for a network address associated with an NF, the second request specifying the first NFType;

determining that the first NFType meets the forwarding criterion; and in response, sending, via the second communications interface, the first request for the network address associated with the NF to the second registry device.

11. The system according to claim 9, wherein:

the system further comprises a fourth registry device;

the fourth registry device comprises:

a fourth communications interface; and a fourth control unit configured to perform fourth operations; and the fourth operations comprise:

receiving, via the fourth communications interface, a second registration message from the first NF, the second registration message specifying the first network address associated with the first NF; and sending, in response, the registration message to the first registry device.

12. The system according to claim 9, wherein:

the second operations comprise sending a request for registration data; and the first operations comprise:

receiving the request for the first registration data; and sending, in response, the indication of the registration to the second registry device.

13. The system according to claim 9, wherein the first operations comprise:

establishing a first network connection to the second registry device;

sending the indication of the registration to the second registry device via the first network connection;

establishing a second network connection to a fourth registry device; and sending the indication of the registration to the fourth registry device via the second network connection.

* * * * *